(12) United States Patent
Tan et al.

(10) Patent No.: US 8,168,330 B2
(45) Date of Patent: May 1, 2012

(54) LITHIUM TITANATE CELL WITH REDUCED GASSING

(75) Inventors: Taison Tan, Fishers, IN (US); Hiroyuki Yumoto, Fishers, IN (US); Qi Zhang, Indianapolis, IN (US); Mohamed Taggougui, Fishers, IN (US)

(73) Assignee: Enerdel, Inc., Indianapolis, IN (US)

( * ) Notice: Subject to any disclaimer, the term of this patent is extended or adjusted under 35 U.S.C. 154(b) by 0 days.

(21) Appl. No.: 12/885,894

(22) Filed: Sep. 20, 2010

(65) Prior Publication Data

US 2011/0067230 A1    Mar. 24, 2011

Related U.S. Application Data

(63) Continuation-in-part of application No. 12/015,901, filed on Jan. 17, 2008, now Pat. No. 7,820,327.

(60) Provisional application No. 60/880,818, filed on Jan. 17, 2007, provisional application No. 60/881,263, filed on Jan. 19, 2007, provisional application No. 60/899,089, filed on Feb. 2, 2007.

(51) Int. Cl.
*H01M 4/58* (2010.01)

(52) U.S. Cl. .................. 429/231.5; 429/231.1; 429/209; 423/596

(58) Field of Classification Search .................. 180/313; 423/69, 71, 598; 429/24, 40, 209, 231.1, 429/231.5, 231.95

See application file for complete search history.

(56) References Cited

U.S. PATENT DOCUMENTS

| | | | |
|---|---|---|---|
| 5,192,629 A | 3/1993 | Guyomard et al. | |
| 5,545,468 A | 8/1996 | Koshiba | |
| 6,022,640 A | 2/2000 | Takada | |
| 6,139,815 A | 10/2000 | Atsumi | |
| 6,221,531 B1 | 4/2001 | Vaughey | |
| 6,274,271 B1 | 8/2001 | Koshiba | |
| 6,316,145 B1 | 11/2001 | Kida et al. | |
| 6,645,673 B2 | 11/2003 | Yamawaki | |

(Continued)

FOREIGN PATENT DOCUMENTS

CN    101512823    8/2009

(Continued)

OTHER PUBLICATIONS

Colbow et al., "Structure and Electrochemistry of the Spinel Oxides LiTi2O4 and Li4/3Ti5/3O4", Journal of Power Sources, 26, 1989, pp. 397-402.

(Continued)

*Primary Examiner* — Stuart Hendrickson
*Assistant Examiner* — Richard M Rump
(74) *Attorney, Agent, or Firm* — Faegre Baker Daniels

(57) ABSTRACT

A method of manufacturing a lithium cell is disclosed. The method can include providing a lithium cell having an operating voltage range, where the lithium cell includes a negative electrode, a positive electrode, and an electrolyte in contact with, and between, the negative electrode and the positive electrode. The negative electrode can include lithium titanate and the electrolyte can include an additive. The method can also include reducing the additive to form a coating on a surface of the negative electrode in contact with the electrolyte. The reducing step can include overcharging the lithium cell to a voltage greater than an upper limit of the operating voltage range and dropping a voltage of the negative electrode to 0.2-1V vs. lithium.

21 Claims, 15 Drawing Sheets

U.S. PATENT DOCUMENTS

| | | | |
|---|---|---|---|
| 6,677,082 B2 | 1/2004 | Thackeray et al. | |
| 6,680,143 B2 | 1/2004 | Thackeray et al. | |
| 6,703,438 B2 | 3/2004 | Hareyama | |
| 6,881,393 B2 | 4/2005 | Spitler | |
| 6,890,510 B2 | 5/2005 | Spitler | |
| 6,916,579 B2 | 7/2005 | Gorchkov | |
| 7,303,840 B2 | 12/2007 | Thackeray | |
| 7,435,402 B2 | 10/2008 | Kang et al. | |
| 7,541,016 B2 | 6/2009 | Gorshkov et al. | |
| 7,629,081 B2 | 12/2009 | Inagaki et al. | |
| 7,635,541 B2 | 12/2009 | Scott et al. | |
| 7,875,389 B2 | 1/2011 | Scott et al. | |
| 2001/0031401 A1 | 10/2001 | Yamawaki | |
| 2002/0064704 A1 | 5/2002 | Thackeray | |
| 2002/0197532 A1 | 12/2002 | Thackeray | |
| 2003/0118911 A1* | 6/2003 | Choy et al. | 429/326 |
| 2004/0043295 A1 | 3/2004 | Rodriguez | |
| 2004/0131941 A1 | 7/2004 | Belharouak et al. | |
| 2004/0238848 A1 | 12/2004 | Arai | |
| 2005/0019670 A1 | 1/2005 | Amine | |
| 2005/0064282 A1 | 3/2005 | Inagaki | |
| 2006/0024582 A1* | 2/2006 | Li et al. | 429/232 |
| 2006/0068272 A1 | 3/2006 | Takami | |
| 2006/0088767 A1* | 4/2006 | Li et al. | 429/231.95 |
| 2006/0216612 A1 | 9/2006 | Jambunathan | |
| 2007/0009801 A1 | 1/2007 | Inagaki et al. | |
| 2007/0281214 A1 | 12/2007 | Saruwatar et al. | |
| 2007/0298314 A1* | 12/2007 | Partin et al. | 429/62 |
| 2008/0166637 A1 | 7/2008 | Inagaki et al. | |
| 2008/0226987 A1 | 9/2008 | Yumoto | |
| 2009/0035662 A1 | 2/2009 | Scott et al. | |
| 2009/0274849 A1 | 11/2009 | Scott | |
| 2010/0178570 A1* | 7/2010 | Kozono et al. | 429/338 |
| 2010/0255352 A1 | 10/2010 | Inagaki et al. | |
| 2010/0279155 A1 | 11/2010 | Scott et al. | |

FOREIGN PATENT DOCUMENTS

| | | |
|---|---|---|
| EP | 1677375 | 7/2006 |
| EP | 1722439 | 11/2006 |
| JP | 2005135775 | 5/2005 |
| JP | 2010205563 | 9/2010 |
| WO | 2007120607 | 10/2007 |
| WO | WO 2008029899 A1 * | 3/2008 |
| WO | 2009122266 | 10/2009 |

OTHER PUBLICATIONS

Deschanvres et al., "Mise En Evidence Et Etude Cristallographique D'Une Nouvelle Solution Solide De Type Spinelle $Li1+xTi2-xO4$ $0\< x \<0,333$" Mat. Res. Bull., vol. 6, 1971, pp. 699-704.

Kubiak et al., "Phase Transition in the Spinel $Li4Ti5O12$ Induced by Lithium Insertion Influence of the Substitutions Ti/V, Ti/Mn, Ti/Fe", Journal of Power Sources, V. 119-121, 2003, pp. 626-630.

Nakayama et al., "Mixed Conduction for the Spinel Type $(1-x)Li4/3Ti5/3O4-xLiCrTiO4$ System", Solid State Ionics, v. 117, 1999. pp. 265-271.

Ohzuku et al., "Zero-Strain Insertion Material of $Li[Li1/3Ti5/3]O4$ for Rechargeable Lithium Cells", J. of Electrochemical Society, V. 142, No. 5, 1995, pp. 1431-1435.

Schamer et al., "Evidence of Two-Phase Formation Upon Lithium Insertion into the $Li1.33Ti1.67O4$ Spinel", Journal of the Electrochemical Society, V. 146, No. 3, 1999, pp. 857-861.

International Search Report PCT/US2007/008753; 10 pages.

U. Roy et al., Preparation and Superconducting Properties of Lithium Titanate, IEEE Transactions on Magnetics, vol. MAG-13, No. 1, Jan. 1977, pp. 836-839.

European Patent Office, Office Action for EP2115801, Feb. 3, 2011, 12 pages.

A. Y. Shenouda et al., "Electrochemical properties of doped lithium titanate compounds and their performance in lithium rechargeable batteries," *Journal of Power Sources* 176 (2008), pp. 332-339.

K. Amine et al., "Advanced cathode materials for high-power applications," *Journal of Power Sources* 146 (2005), pp. 111-115.

* cited by examiner

US 8,168,330 B2

LITHIUM TITANATE CELL WITH REDUCED GASSING

CROSS REFERENCE TO RELATED APPLICATIONS

This application is a continuation-in-part of U.S. patent application Ser. No. 12/015,901, filed Jan. 17, 2008 now U.S. Pat. No. 7,820,327, which claims priority to U.S. Provisional Patent Application Ser. No. 60/880,818, filed on Jan. 17, 2007, U.S. Provisional Patent Application Ser. No. 60/881, 263, filed on Jan. 19, 2007, and U.S. Provisional Patent Application Ser. No. 60/899,089, filed on Feb. 2, 2007, all of the foregoing are incorporated herewith by reference in their entirety.

FIELD OF THE INVENTION

This present invention generally relates to a method of manufacturing a lithium battery, in particular, a method of forming a film on the negative electrode of a lithium battery.

DESCRIPTION OF THE RELATED ART

Motor vehicles such as, for example, hybrid vehicles use multiple propulsion systems to provide motive power. The most common hybrid vehicles are gasoline-electric hybrid vehicles, which include both an internal-combustion engine (ICE) and an electric motor. The gasoline-electric hybrid vehicles use gasoline to power the ICE, and an electric battery to power the electric motor. The gasoline-electric hybrid vehicles recharge their batteries by capturing kinetic energy. The kinetic energy may be provided via regenerative braking or, when cruising or idling, from the output of the ICE. This contrasts with pure electric vehicles, which use batteries charged by an external source such as a power grid or a range extending trailer.

The batteries include rechargeable lithium-based cells that typically comprise two dissimilar electrodes, i.e., an anode and a cathode, that are immersed in an ion conducting electrolyte, with a separator positioned between the two electrodes. Electrical energy is produced in the cells by an electrochemical reaction that occurs between the two dissimilar electrodes.

The largest demand placed on the battery occurs when it must supply current to operate the electric motor during acceleration. The amperage requirements of the electric motor may be over several hundred amps. Most types of batteries that are capable of supplying the necessary amperage have a large volume or require bulky packaging, which results in excessive weight of the batteries and adds cost to the batteries. At the same time, such high currents are only required for short periods of time, usually seconds. Therefore, so called "high power" batteries, which provide high currents for short periods of time, are typically ideal for hybrid and pure electric vehicle applications.

Rechargeable batteries that include rechargeable lithium-based cells, which may be characterized as either lithium cells, lithium ion cells, or lithium polymer cells, combine high electric power-generating capacity with the potential for power and cycle-life needed to enable the hybrid vehicles to meet performance standards while remaining economical. By "high electric power-generating capacity", it is meant that the rechargeable batteries have four times the energy density of lead-acid batteries and two to three times the energy density of nickel-cadmium and nickel-metal hydride batteries. Rechargeable batteries including the lithium-based cells also have the potential to be one of the lowest-cost battery systems.

Lithium titanate represented by the formula $Li_4Ti_5O_{12}$ (or $Li_{4/3}Ti_{5/3}O_4$) is considered to be one of the most prospective materials for use in the anodes of rechargeable lithium ion and lithium polymer cells. Lithium titanate, $Li_4Ti_5O_{12}$ is known from A. Deschanvers et al. (Mater. Res. Bull., v. 6, 1971, p. 699). As it was later published by K. M. Colbow et al. (J. of Power Sources. v. 26. N. 3/4, May 16, 1989, pp. 397-402), $Li_4Ti_5O_{12}$ is able to act in a reversible electrochemical reaction, while elemental lithium is incapable of such reversible reactions. After detailed research conducted by T. Ozhuku et al. (J. of Electrochemical Society, v. 142, N. 5, 1995, pp. 1431-1435) lithium titanate started to become considered for use as an anode material for rocking-chair type lithium cells. In fact, U.S. Pat. No. 5,545,468 to Koshiba et al. discloses the use of a lithium titanate having varying ratios of lithium to titanium in the lithium titanate. More specifically, the lithium titanate of the '468 patent is of the formula $Li_xTi_yO_4$, wherein $0.8 \leq x \leq 1.4$ and $1.6 \leq y \leq 2.2$, in a cathode for a lithium cell. The '468 patent specifies that fundamentally, $x+y \approx 3$. In other words, the '468 patent teaches that the lithium titanate may include different ratios of lithium to titanium, so long as the amount of lithium and titanium together equal about 3 such that there is a stoichiometric amount of lithium and titanium to oxygen. United States Patent Publication No. 2002/0197532 to Thackeray et al. also discloses a lithium titanate that is used as an anode in a lithium cell. The lithium titanate may be a stoichiometric or defect spinel, in which the distribution of lithium can vary from compound to compound.

In addition to an ability to act in the reversible electrochemical reaction, $Li_4Ti_5O_{12}$ also has other advantages that make it useful in rechargeable lithium-based cells. For example, due to a unique low volume change of the lithium titanate during the charge and discharge processes, the lithium titanate has excellent cycleability, i.e., many cycles of charging and discharging may occur without deterioration of the cells. The excellent cycleabilty of the lithium titanate is primarily due to a cubic spinel structure of $Li_4Ti_5O_{12}$. According to data of S. Scharner et al. (J. of Electrochemical Society, v. 146, N. 3, 1999, pp. 857-861) a lattice parameter of the cubic spinel structure (cubic, Sp. Gr. Fd-3m (227)) varies from 8.3595 to 8.3538 Å for extreme states during charging and discharging. This linear parameter change is equal to a volume change of about 0.2%. $Li_4Ti_5O_{12}$ has an electrochemical potential versus elemental lithium of about 1.55 V and can be intercalated with lithium to produce an intercalated lithium titanate represented by the formula $Li_7Ti_5O_{12}$, which has a theoretical electric power-generating capacity of up to and including 175 mA*hrs/g.

Another advantage of $Li_4Ti_5O_{12}$ is that it has a flat discharge curve. More specifically, the charge and discharge processes of $Li_4Ti_5O_{12}$ take place in a two-phase system. $Li_4Ti_5O_{12}$ has a spinel structure and, during charging, transforms into $Li_7Ti_5O_{12}$, which has an ordered rock-salt type structure. As a result, electric potential during the charge and discharge processes is determined by electrochemical equilibrium of the $Li_4Ti_5O_{12}/Li_7Ti_5O_{12}$ pair, and is not dependant on lithium concentration. This is in contrast to the discharge curve of most other electrode materials for lithium power sources, which maintain their structure during the charge and discharge processes. For example, although a transition of a charged phase in most cathode materials such as $LiCoO_2$ is pre-determined, there is still an extended limit of variable composition $Li_xCoO_2$ between these structures. As a result, electrical potential of materials such as $LiCoO_2$ depends on a lithium concentration in the $LiCoO_2$, i.e., a state of charge or discharge. Thus, a discharge curve in materials in which the electrical potential is dependent on the lithium concentration in the material is typically inclined and is often a step-like curve.

There is a general consensus within the art that maintenance of excellent electric power-generating capacity correlates to excellent electronic conductivity. $Li_4Ti_5O_{12}$ includes titanium in a highest oxidation degree of +4, which correlates to very low electronic conductivity. An electronic conductivity of similar compounds is so low that many of those compounds are borderline dielectrics or insulators. As such, power generating capacity of $Li_4Ti_5O_{12}$ is less than ideal. The same holds true for the lithium titanates of the '468 patent and the '532 publication, as set forth above.

Typically, electronic conductivity of the $Li_4Ti_5O_{12}$ is improved by doping the $Li_4Ti_5O_{12}$ with 3d-elements, as disclosed by M. Nakayama et al (Solid State Ionics, 4. 117, I. 3-4, 2 Feb. 1999, pp. 265-071). For example, electronic conductivity of $Li[Li_{(1-x)/3}Cr_xTi_{(5-2x)/3}]O4$. which is considered to be a solid solution between $Li_4Ti_5O_{12}$ and $LiCrTiO_4$, is better than electronic conductivity of the $Li_4Ti_5O_{12}$. However, an increase in the amount of Cr ions substituted for titanium ions in the $Li_4Ti_5O_{12}$ also decreases reversible electric power-generating capacity, as compared to $Li_4Ti_5O_{12}$, due to electrochemical inactivity attributable to the presence of the Cr ions. The presence of the Cr ions lowers area specific impedance (ASI and increases rate capability, as compared to ASI and rate capability of $Li_4Ti_5O_{12}$. The loss in capacity is substantially equal to the share of replaced titanium.

Other attempts to replace the titanium in lithium titanates exhibit similar drawbacks. For example, substitution of titanium in $Li_4Ti_5O_{12}$ with vanadium, manganese, and iron results in significant loss of reversible electric power-generating capacity during a first charge-discharge cycle. See P. Kubiak, A. Garsia, M. Womes, L. Aldon, J. Olivier-Fourcade, L E. Lippens, J.-C. Jumas "Phase transition in the spinel $Li_4Ti_5O_{12}$ induced by lithium insertion. Influence of the substitution Ti/V, Ti/Mn, Ti/Fe" (J. of Power Sources, v. 119-121. Jun. 1, 2003, pp. 626-630).

In addition, the use of lithium titanate has proven difficult due to the generation of gas during use. The generation of gas in a sealed lithium cell creates internal pressures, which can reduce cell efficiency or cause the cell to rupture.

In view of the foregoing, there remains an opportunity to provide a lithium titanate that is modified to exhibit excellent electronic conductivity while maintaining reversible electric power-generating capacity that is characteristic of lithium titanate. There is also an opportunity to provide lithium-based cells and batteries that include the lithium titanate.

SUMMARY OF THE INVENTION AND ADVANTAGES

A method of manufacturing a battery is disclosed. The method can include providing a lithium cell having an operating voltage range. The lithium cell can include a negative electrode, a positive electrode, and an electrolyte in contact with, and between, the negative electrode and the positive electrode. The negative electrode can include lithium titanate, the positive electrode can include lithium titanate, or both the negative and positive electrode can include lithium titanate. The electrolyte can include an additive.

The method can also include forming a coating on an interface surface of the negative electrode in contact with the negative electrode by reducing the additive. The forming step can include overcharging the lithium cell to a voltage greater than an upper limit of the operating voltage range, while dropping a voltage of the negative electrode to a range of 0.2-1V vs. lithium, or to a range from 0.5-0.9V vs. lithium.

The duration of the forming step can be sufficient to produce a continuous coating on the interface surface of the negative electrode. A lower limit of the operating voltage range can be 1.3 V or greater. The electrolyte can decompose at a potential vs. lithium of from 1.5 V to 3.0 V, and the continuous coating can prevent decomposition of the electrolyte at voltages ranging from 0 to 4V.

The additive can include an elemental ingredient selected from the group consisting of boron, phosphorous, sulfur, fluorine, carbon, boron, and combinations thereof. The additive can be an additive selected from the group consisting of lithium hexafluorophosphate ($LiPF_6$), lithium bis-oxalatoborate (LiBOB), lithium perchlorate ($LiClO_4$), lithium hexafluoroarsenate ($LiAsF_6$), lithium trifluoromethanesulfonate ($LiCF_3SO_3$), lithium trifluoromethanesulfonimide ($Li(CF_3SO_2)_2N$, lithium tetrafluoroborate ($LiBF_4$), lithium tetrachloroaluminate ($LiClO_4$), lithium hexafluoroantimonate ($LiSbF_6$), lithium tetrafluoro(oxalate)phosphate (LiFOP), lithium difluoro(oxalato)borate (LiFOB), phosphazenes, $CO_2$, phosphate esters, borate esters, and water. The additive can be lithium bis-oxalatoborate (LiBOB), phosphazene, or a mixture of both.

The additive can include at least one chelato borate salt. The additive can be an additive selected from the group consisting of carbonates, chloroethylene carbonate, vinylene carbonate, vinylethylenecarbonate, sulfites, ethylene sulfite, propane sulfone, propylene sulfite, butyrolactones, phenylethylene carbonate, phenylvinylene carbonate, catechol carbonate, vinyl acetate, vinylethylene carbonate, dimethyl sulfite, fluoroethylene carbonate, trifluoropropylene carbonate, bromo gamma-butyrolactone, fluoro gamma-butyrolactone, and combinations thereof.

The lithium titanate can include a lithium titanate of formula:

$$Li_4Ti_5O_{12-x},$$

wherein x is greater than 0 and less than 12. The value of x can be greater than 0 and less than 0.02. The average valence of titanium in the lithium titanate can be less than 4.

The negative electrode can include a first lithium titanate having the following formula: $Li_4Ti_5O_{12}$, and a second lithium titanate different from the first lithium titanate. The second lithium titanate can be of the formula: $Li_4Ti_5O_{12-x}$, wherein x is greater than 0 and less than 12. The amount of the second lithium titanate in the negative electrode can be greater than the amount of the first lithium titanate in the negative electrode. The negative electrode can include at least 10 wt-% more of the second lithium titanate ($Li_4Ti_5O_{12-x}$) than the first lithium titanate, based on the total amount of the first and second lithium titanates. In other words, the percentage of second lithium titanate ($Li_4Ti_5O_{12-x}$) based on the total amount of the first and second lithium titantates can be at least 55 wt-%, or at least 65 wt-% or at least 75 wt-%.

The lithium cell can also include a gas absorbing material. The gas absorbing material can be selected from the group consisting of ZnO, $NaAl_2$, silicon, and combinations thereof. The negative electrode can include the gas absorbing material. The lithium cell can also include a separator, where the gas absorbing material is retained by the separator.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

A lithium titanate of the present invention is useful in lithium-based cells. The lithium-based cells including the lithium titanate of the present invention are useful in many applications, but are particularly useful in rechargeable batteries for vehicles 10, such as hybrid or electric vehicles 10. However, it is to be appreciated that the lithium-based cells may be used in non-rechargeable batteries. The rechargeable batteries are a power source for an electric motor of the vehicles 10. The lithium-based cells may also be known as lithium ion cells. In addition, lithium ion batteries are also referred to as secondary batteries and vice versa. Often, lithium ion batteries in particular are referred to as rocking-chair type batteries because lithium ions move between positive and negative electrodes, which are described further below.

The lithium-based cells include an electrolyte, an anode, and a cathode. It is to be appreciated that description of the anode and the cathode are interchangeable with description of the electrode (or electrodes) in the description of the present invention. Electrolytes for the lithium-based cells are typically organic electrolytes and/or non-aqueous lithium ion-conducting electrolytes and are known in the art. Suitable electrolytes, for purposes of the present invention, are described in further detail below. Typically, at least one of the anode and the cathode includes the lithium titanate of the present invention. For example, the lithium-based cell may be further defined as a lithium cell, wherein the cathode comprises the lithium titanate of the present invention. The lithium titanate is typically present in the cathode in an amount of at least 80 parts by weight, more typically from 80 to 90 parts by weight, most typically in an amount of about 82 parts by weight based on the total weight of the cathode. In addition to the lithium titanate, the cathode in the lithium cell also typically includes a conductive agent such as carbon black along with a binder agent (or adhesive), such as poly-vinylidene fluoride (PVDF), which can make up the balance of the cathode. More specifically, the carbon black is typically present in an amount of from 8 to 10 parts by weight, more typically about 8 parts by weight based on the total weight of the cathode, and the binder agent is typically present in an amount of from 8 to 12 parts by weight, more typically about 10 parts by weight, based on the total weight of the cathode. The anode in the lithium cells is typically a lithium metal or lithium alloy with magnesium or aluminum.

Alternatively, the lithium-based cell or battery may be further defined as one of a lithium ion cell and a lithium polymer cell, wherein the anode comprises the lithium titanate of the present invention in the amounts set forth above.

Figure 1:
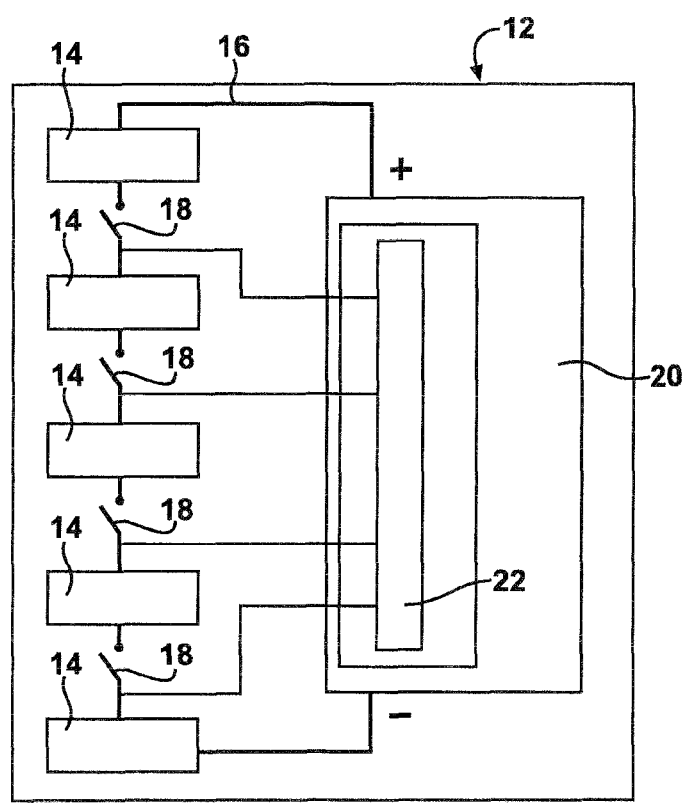
FIG. 1 is a schematic view of a rechargeable battery including lithium-based cells.
Figure 2:
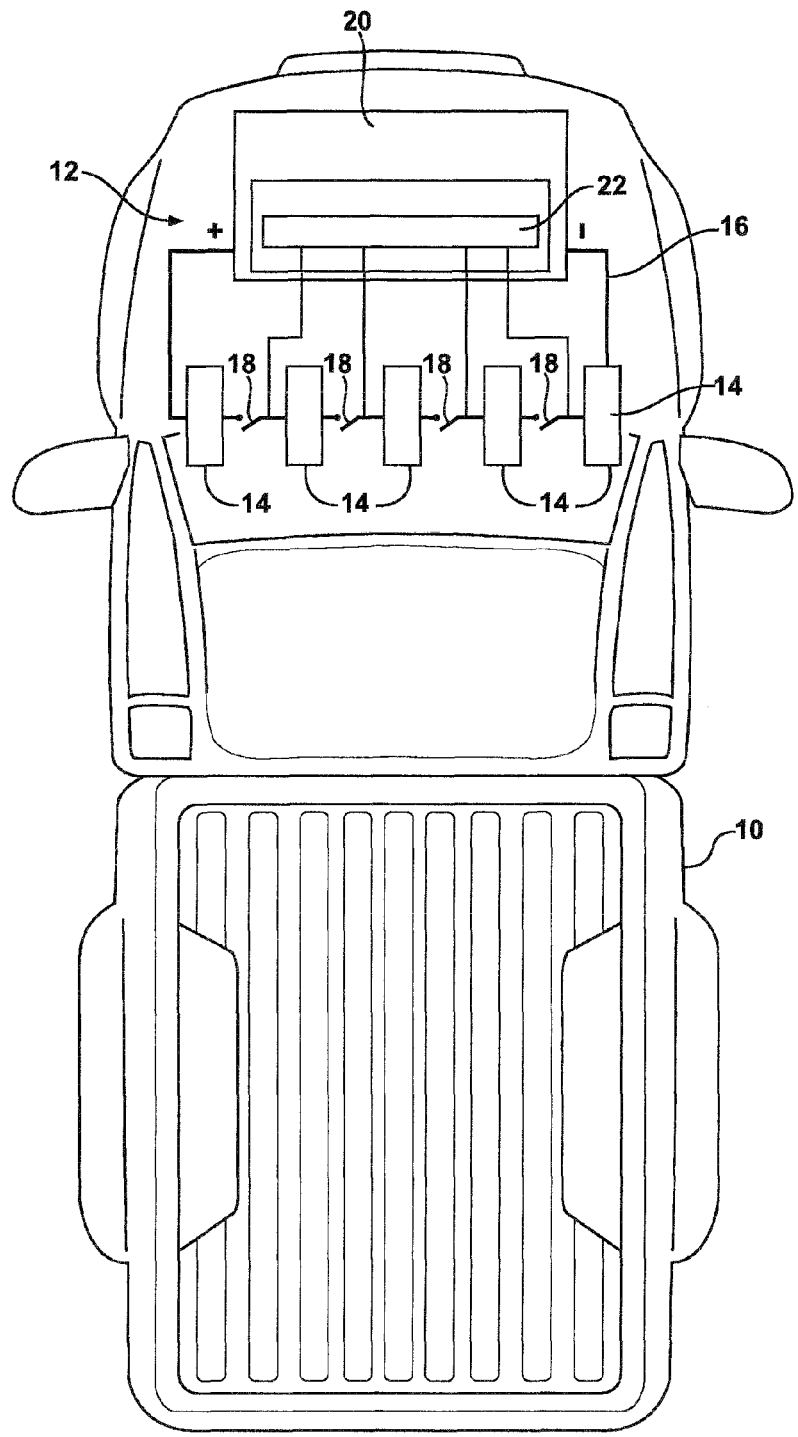
FIG. 2 is a schematic view of a vehicle including the rechargeable battery of FIG. 1.

When used in rechargeable batteries for applications that include, but are not limited to, hybrid or electric vehicles 10, the cells are typically used in a battery pack, represented by 14 in FIGS. 1 and 2. The battery packs 14 typically include four rows of the cells that are interconnected and extend along each row in overlapping relationship. Each row typically includes five stacks of the cells. However, it is to be appreciated that other configurations of the cells within the battery pack 14 may also be used. Other configurations of batteries and cells are described further below.

As known in the art, the rechargeable batteries typically include a plurality of the battery packs 14 connected in a circuit in order to provide sufficient energy for powering the vehicle 10. As shown in FIGS. 1 and 2, the circuit is configured with switches 18 and a battery management system 20 disposed in the circuit 16. The battery management system 20 includes a switch control and interface circuit 22 to control energy usage from and recharge of the cells in the battery packs 14.

The lithium titanate of the present invention has the following formula:

$Li_4Ti_5O_{12-x}$

Wherein x is greater than 0 and less than 12. Typically, 0<x<0.02. In other words, the lithium titanate of the present invention is deficient of oxygen, which has excellent electronic conductivity, as compared to lithium titanate of the above formula that is not deficient of oxygen, e.g., $Li_4Ti_5O_{12}$. At the same time, concentration of lithium in the lithium titanate of the present invention remains the same as for lithium titanate that is not deficient of oxygen. As a result, expected reversible electric power-generating capacity of the lithium titanate of the present invention will remain the same as the reversible electric power-generating capacity of lithium titanate that includes a stoichiometric amount of oxygen.

Figure 3:
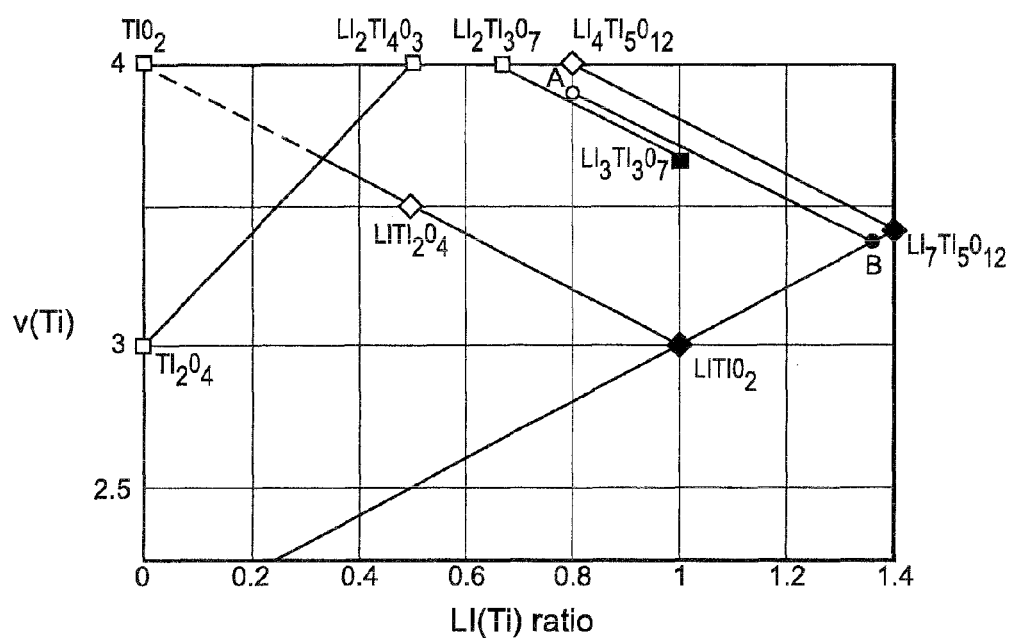
FIG. 3 is a lithium titanate composition-valence diagram showing a relationship between ratios of lithium to titanium in lithium titanate to a valence of titanium in the lithium titanate, with diamonds indicating spinel structures, squares indicating non-spinel structures, with filled symbols indicating lithium titanates that include intercalated lithium ions.

The effect on electronic conductivity as a result of the oxygen deficiency is attributable to changes in an oxidation state, i.e., valence, of the titanium in the lithium titanate. More specifically, lithium titanates that include titanium atoms in a +3 oxidation state exhibit high electronic conductivity that is characteristic of metal-like material, while lithium titanates that include titanium atoms in a +4 oxidation state exhibit low electronic conductivity that is characteristic of a dielectric material. Referring to FIG. 3, the oxidation state of various lithium titanates is represented on the vertical axis as v(Ti), i.e., valence of titanium. As such, FIG. 3 indicates the relative electronic conductivity of the various lithium titanates, at various states of intercalation, with higher v(Ti) correlating to lower electronic conductivity. $Li_4Ti_5O_{12}$ is an example of lithium titanate having the titanium atoms in the +4 oxidation state.

During electrochemical intercalation or charging of conventional $Li_4Ti_5O_{12}$, phase transition from spinel to "rock salt"-type occurs wherein three lithium atoms are intercalated into the conventional $Li_4Ti_5O_{12}$ to produce $Li_7Ti_5O_{12}$. $Li_7Ti_5O_{12}$ has a higher electronic conductivity than the conventional $Li_4Ti_5O_{12}$ due to the transformation of titanium atoms in the conventional $Li_4Ti_5O_{12}$ from the +4 oxidation state to the +3 oxidation state during intercalation, as shown in FIG. 3 and as represented by the following equation:

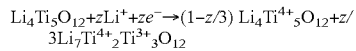
$$Li_4Ti_5O_{12}+zLi^++ze^- \rightarrow (1-z/3)\, Li_4Ti^{4+}{}_5O_{12}+z/3\,Li_7Ti^{4+}{}_2Ti^{3+}{}_3O_{12}$$

Wherein z represents the number of lithium atoms that are intercalated into the $Li_4Ti_5O_{12}$. As such, the conventional $Li_4Ti_5O_{12}$ exhibits variable electronic conductivity based on the state of intercalation and zones of low and high electronic conductivity may exist during intercalation and discharge due to the disparate differences in electronic conductivity between the conventional $Li_4Ti_5O_{12}$ and $Li_7Ti_5O_{12}$. Poor electronic conductivity of the conventional $Li_4Ti_5O_{12}$ causes initial "training" of the cells by low current as well as prevention of a complete charge. These circumstances extremely limit opportunities of use of the conventional $Li_4Ti_5O_{12}$ for high rate applications.

In accordance with the present invention, it was surprisingly found that the following relationship exists:

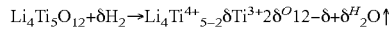
$$Li_4Ti_5O_{12}+\delta H_2 \rightarrow Li_4Ti^{4+}{}_{5-2\delta}Ti^{3+}{}_{2\delta}O_{12-\delta}+\delta^H{}_2O\uparrow$$

In effect, reduction of $Li_4Ti_5O_{12}$ to form the $Li_4Ti_5O_{12-x}$ results in the transformation of titanium atoms in the $Li_4Ti_5O_{12}$ from the +4 oxidation state to the +3 oxidation state as a result of charge compensation, thereby exhibiting increased electronic conductivity of the $Li_4Ti_5O_{12-x}$ while retaining the same number of lithium and titanium atoms in the lithium titanate. Stated differently, an average valence of titanium in the lithium titanate of the present invention is less than 4. The practical result of the above finding is that the lithium titanate will exhibit less drastic changes in electronic conductivity at all stages of charge and discharge processes, as opposed to the conventional $Li_4Ti_5O_{12}$ that exhibits electronic conductivity that is near that of dielectric materials prior to charging, such that different zones of $Li_4Ti_5O_{12-x}$ and $Li_7Ti_5O_{12-x}$ will exhibit more uniform media for charge and discharge processes, as compared to conventional $Li_4Ti_5O_{12}$, which is advantageous for high-rate applications.

Since the same numbers of electrochemically active lithium and titanium atoms are present as are present in the $Li_4Ti_5O_{12}$, expected reversible electric power-generating capacity will be the same for the $Li_4Ti_5O_{12-x}$ as for the $Li_4Ti_5O_{12}$. The $Li_4Ti_5O_{12-x}$ also retains the same spinel structure as $Li_4Ti_5O_{12}$, which has excellent cycleability. As set forth above, typically, 0<x<0.02 in order to maintain the lithium titanate having the same spinel structure as the $Li_4Ti_5O_{12}$. More specifically, referring to FIG. 3, the lithium titanate of the present invention, by having the oxygen deficiency, shifts the $Li_4Ti_5O_{12-x}$ to a position represented by "A" in FIG. 3 due to the transformation of titanium atoms in the $Li_4Ti_5O_{12}$ from the +4 oxidation state to the +3 oxidation state, with the position represented by "B" indicating an intercalation state of the $Li_4Ti_5O_{12-x}$. The value of x, in order to maintain the same spinel structure as $Li_4Ti_5O_{12}$, is limited since lithium titanate with structure of $Li_2Ti_3O_7$ will form if the amount of titanium in the +3 oxidation state becomes too high. $Li_2Ti_3O_7$ has an orthorhombic crystal structure with space group Pbnm (62). Although $Li_2Ti_3O_7$ may be suitable for certain applications, the spinel structure of $Li_4Ti_5O_{12}$ is preferred due to the ability to intercalate more lithium into the structure than can be intercalated into the $Li_2Ti_3O_7$ and also due to the fact that $Li_4Ti_5O_{12}$ exhibits low volume change of from 8.3595 to 8.3538 Å between intercalated and deintercalated states, which provides the excellent cycleability.

A method of forming the $Li_4Ti_5O_{12-x}$ includes the step of providing a mixture of titanium dioxide and a lithium-based component. An exemplary mixture can include powder or particulate mixtures of titanium dioxide, lithium-based components, and any additional ingredients (e.g., binders and gas absorbing materials). Titanium dioxide can be used both in the form of rutile and in the form of anatase, as well as any form of titanium oxide-hydroxide (such as $Ti(OH)_{2x}O_{2-x}$). Any lithium-based component that is typically used for forming $Li_4Ti_5O_{12}$ may be used. Typically, the lithium-based component is selected from the group of lithium carbonate, lithium hydroxide, lithium oxide, and combinations thereof, and the lithium-based component is typically at least 99% pure. Lithium salts or organic acids can also be used. Typically, the lithium-based component and titanium oxide are present in the mixture in amounts necessary to ensure an atomic ratio Li/Ti=0.8 in the final lithium titanate of the present invention.

The mixture including the titanium dioxide and the lithium-based component is sintered in a gaseous atmosphere comprising a reducing agent to form the lithium titanate. More specifically, the mixture is sintered at a temperature of at least 450° C., more typically from about 500 to 925° C., most typically from about 700 to about 920° C., for a period of at least 30 minutes, more typically from about 60 to about 180 minutes.

The reducing agent may be any agent that is capable of reducing the oxygen in the $Li_4Ti_5O_{12}$ and is typically selected from the group of hydrogen, a hydrocarbon, carbon monoxide and combinations thereof. The reducing agent is typically present in the gaseous atmosphere in a concentration of at least 0.1% by volume, more typically from about 1 to about 100% by volume, in order to sufficiently reduce the $Li_4Ti_5O_{12}$ to form the $Li_4Ti_5O_{12-x}$.

In addition to the reducing agent, the gaseous atmosphere typically includes another gas selected from the group of an inert, an inactive gas, and combinations thereof. Any inert gas may be used, such as any noble gas, in order to prevent unwanted side reactions during sintering and in order to prevent introduction of impurities into the $Li_4Ti_5O_{12-x}$. Inactive gas that may be used is, for example, pure nitrogen.

Other embodiments of the present invention will now be described. Specifically, other types of lithium cells (or lithium ion cells) and lithium batteries (or lithium ion batteries) are also provided by the subject invention. Typically, as described above, the lithium cells or batteries include positive (e.g., anode) and negative (e.g., cathode) electrodes. Generally, the positive and negative electrodes include a material or materials that can occlude lithium or lithium ions, such as those described and exemplified above.

Figure 5:
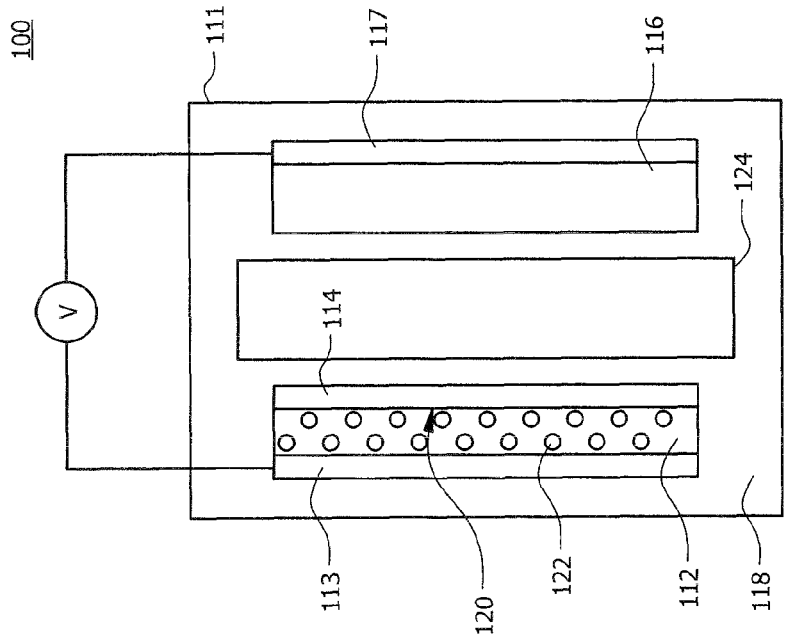
FIG. 5 is a schematic of a battery after formation of a coating on the negative electrode.
Figure 4:
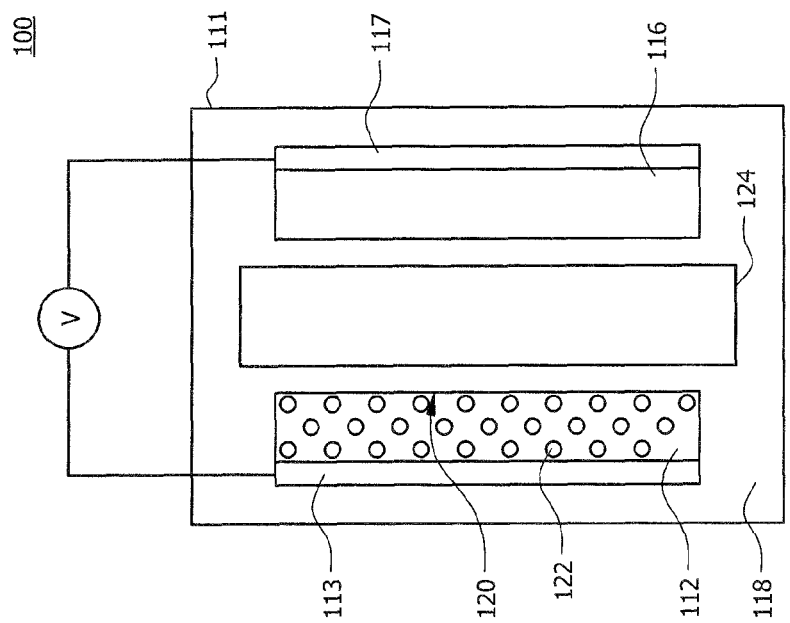
FIG. 4 is a schematic of a battery prior to formation of a coating on the negative electrode.

As shown in FIGS. 4 and 5, in one embodiment the negative electrode 112 is a plate that comprises an active material that can reversibly occlude lithium seeds, e.g., a lithium transition metal oxide, a metallic current collecting material 113, e.g., copper foil, an adhesive (or a binder/binder agent), e.g., PVDF, styrene butadiene rubber (SBR), etc., and optionally, a conductive agent/auxiliary such as carbon black.

In one embodiment, the positive electrode 116 is a plate that comprises an active material that can occlude lithium seeds, a metallic current collecting material 117, an adhesive, and typically a conductive auxiliary. The active material of the positive electrode 116 may be the same as or different than the active material of the negative electrode 112. Further, the metallic current collecting material 117 of the positive electrode 116 may be the same as or different than the metallic current collecting material 113 of the negative electrode 112. Yet further, the adhesive of the positive electrode 116 may be the same as or different than the adhesive of the negative electrode 112. If employed, the conductive auxiliary of the positive electrode 116 may be the same as or different than the conductive auxiliary of the negative electrode 112.

Examples of suitable lithium transition metal oxides, for purposes of the present invention include, but are not limited to, $LiMn_2O_4$, $LiCoO_2$ $LiNiO_2$, $LiFePO_4$, and combinations thereof. Optionally, titanium, aluminum, magnesium, nickel, manganese, and combinations thereof, may be used for doping transition metal sites, as understood by those skilled in the art. It is to be appreciated that the positive and/or negative electrodes may be in other configurations known in the art other than a plate configuration, such as a coiled and/or laminated configurations/structures.

The lithium cells or batteries 100 also include an electrolyte 118, as described above. Typically, the electrolyte 118 can include a lithium salt dissolved in a non-water type solvent. Non-water type solvents can include those that are in a complete liquid, a complete solid, or a gel form between the complete liquid and solid. Suitable liquid electrolytes include, but are not limited to, alkyl carbonates, e.g., propylene carbonate and ethylene carbonate, dialkyl carbonates, cyclic ethers, cyclic esters, glymes, lactones, formats, esters, sulfones, nitrates, oxazoladiones, and combinations thereof Suitable polymers used as solid electrolytes include, but are not limited to, polyethylene oxide (PEO), polymethylene-polyethylene oxide (MPEO), PVDF, polyphosphazenes (PPE), and combinations thereof. Suitable lithium salts include, but are not limited to, $LiPF_6$, $LiClO_4$, LiSCN, $LiAlCl_4$, $LiBF_4$, $LiN(CF_3SO_2)_2$, $LiCF_3SO_3$, $LiC(SO_2CF_3)_3$, $LiO_3SCF_2CF_3$, $LiC_6F_5SO_3$, $LiCF_3CO_2$, $LiAsF_6$, $LiSbF_6$, and combinations thereof It is to be appreciated that the electrolyte 118 may comprise various combinations of the components described and exemplified above, as understood by those skilled in the art.

If a liquid type and/or gel type electrolyte is employed, a separator 124 is typically positioned between the positive 116 and negative 112 electrodes, and the electrolyte 118 is held by the separator 124 to prevent a short circuit within the cell 100. The separator 124 may be any type of separator known in the art, e.g., a porous, polymeric separator. In one embodiment, a lithium ion battery has a negative electrode plate and positive electrode plate with the separator positioned between a coiled structure and a laminated structure. The electrolyte is poured therebetween, and the battery is placed in a metallic or a metallic laminated case 111 and sealed.

As described above, copper foil is generally used as the current collecting material 113 for the negative electrode plate 112. Generally, to prepare the negative electrode plate, a slurry is applied over the copper foil, dried, and pressed. The slurry comprises the active material, the adhesive, and, optionally, the conductive auxiliary. It is to be appreciated that the aforementioned current collector can be made from other metals and/or alloys, including, but not limited to, nickel, titanium, stainless steel, aluminum, and copper, with the latter generally being preferred as previously described. In addition, the current collector 113 can be manufactured into various forms, such as a sheet, a strip, a foil, a mesh, a net, a foamed metal plate, etc.

Typically, the lithium titanate of the present invention, as described and exemplified above, i.e., $Li_4Ti_5O_{12-x}$, is used as the active material for the negative electrode. As described (or alluded to) above, the lithium titanate has excellent cycling characteristics due to its small volumetric change that accompanies charging. In contemporary lithium cells and batteries, a film through a reduction decomposition of an electrolyte is generally formed on the surface of graphite, for example, that is used as a negative electrode in the cell or battery. Such a film inhibits the electrolyte from further decomposition. However, it is believed that lithium titanate does not have a film like that which is generally formed over the surface of the graphite. Therefore, it is believed that when a surface potential of lithium titanate drops below 1.2 V (vs. Li+Li), a large amount of the electrolyte comprises a reducing decomposition and generates gas, which negatively affects cycling characteristics. It is also believed that the binder can be reduced when the surface potential of lithium titanate drops below 1.2 V. To alleviate some of these potential issues, it is typically necessary that the negative electrode have the same or more capacity as the positive electrode when using the lithium titanate.

The present invention also provides an active material suitable for use in lithium cells, such as those described herein. The active material comprises lithium titanate having a surface, and a material disposed on the surface of the lithium titanate. The material is generally non-reactive with the electrolyte within a range of potential vs. lithium of from 0 V to 4 V while the active material is in the presence of the electrolyte. The lithium titanate is as described and exemplified above, i.e., $Li_4Ti_5O_{12-x}$. Typically, once formed, the material prevents the electrolyte from decomposing at the material surface. The material can also be referred to as a surface film or a film.

A method of manufacturing a battery 100 having a coating 114 on the negative electrode 112 is also disclosed. FIG. 4 and FIG. 5 show a battery 100 before and after the manufacturing process, respectively.

The method can include providing a lithium cell 100 that includes a negative electrode 112, a positive electrode 116, and an electrolyte 118 in contact with, and between, the negative electrode 112 and the positive electrode 116. The negative electrode 112 can include lithium titanate, the positive electrode 116 can include lithium titanate, or both the negative 112 and positive 116 electrode can include lithium titanate. The electrolyte 118 can include an additive.

The method can also include forming a coating 114 on an interface surface 120 of the negative electrode 112 in contact with the electrolyte 118 by reducing the additive. The lithium cell 110 can have an operating voltage range and the forming step can include overcharging the lithium cell to a voltage greater than an upper limit of the operating voltage range, while dropping a voltage of the negative electrode 112 below the lower limit of the operating range. For example, the voltage of the negative electrode 112 can drop into a range of 0.2-1V vs. lithium, or to a range from 0.5-0.9V vs. lithium.

The upper limit of the operating voltage range can be 2.8V, or 3.2V or 3.5V. The lower limit of the operating voltage range can be 1V, or 1.2V, or 1.3V. As used herein, the operating voltage range, is the range of voltages within which the lithium cell is designed to operate during standard usage by the end user.

The duration of the forming step can be sufficient to produce a continuous coating 114 on the interface surface 120 of the negative electrode 112. The coating 114 can include reduction products of an additive in the electrolyte 118. A lower limit of the operating voltage range can be 1.3 V or greater. The electrolyte 118 can decompose at a potential vs. lithium of from 1.5 V to 3.0 V and the continuous coating 114 can prevent decomposition of the electrolyte 118 at voltages ranging from 0 to 4V.

The additive can include an elemental ingredient selected from the group consisting of boron, phosphorous, sulfur, fluorine, carbon, boron, and combinations thereof. The additive can be an additive selected from the group consisting of lithium hexafluorophosphate ($LiPF_6$), lithium bis-oxalatoborate (LiBOB), lithium perchlorate ($LiClO_4$), lithium hexafluoroarsenate ($LiAsF_6$), lithium trifluoromethanesulfonate ($LiCF_3SO_3$), lithium trifluoromethanesulfonimide ($Li(CF_3SO_2)_2N$), lithium tetrafluorobo ate ($LiBF_4$), lithium tetrachloroaluminate ($LiClO_4$), lithium hexafluoroantimonate ($LiSbF_6$), lithium tetrafluoro(oxalate)phosphate (LiFOP), lithium difluoro(oxalato)borate (LiFOB), phosphazenes, $CO_2$, phosphate esters, borate esters, and water. The additive can be lithium bis-oxalatoborate (LiBOB), phosphazene, or a mixture of both.

The additive can include at least one chelato borate salt. The additive can include an additive selected from the group consisting of carbonates, chloroethylene carbonate, vinylene carbonate, vinylethylenecarbonate, sulfites, ethylene sulfite, propane sulfone, propylene sulfite, butyrolactones, phenylethylene carbonate, phenylvinylene carbonate, catechol carbonate, vinyl acetate, vinylethylene carbonate, dimethyl sulfite, fluoroethylene carbonate, trifluoropropylene carbonate, bromo gamma-butyrolactone, fluoro gamma-butyrolactone, and combinations thereof. One or more additives can be present in the electrolyte 118.

The lithium titanate can include a lithium titanate of formula:

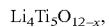

$Li_4Ti_5O_{12-x}$, wherein x is greater than 0 and less than 12. The value of x can be greater than 0 and less than 0.02. The average valence of titanium in the lithium titanate can he less than 4.

The negative electrode 112 can include a first lithium titanate having the following formula: $Li_4Ti_5O_{12}$, and a second lithium titanate different from the first lithium titanate. The second lithium titanate can be of the formula: $Li_4Ti_5O_{12-x}$, wherein x is greater than 0 and less than 12. The amount of the second lithium titanate in the negative electrode 112 can be greater than the amount of the first lithium titanate in the negative electrode. The negative electrode 112 can include at least 10 wt-% more of the second lithium titanate than the first lithium titanate, based on the total amount of the first and second lithium titanate.

The lithium cell 100 can also include a gas absorbing material 122. The gas absorbing material 122 can be selected from the group consisting of ZnO, $NaAlO_2$, silicon, and combinations thereof. The negative electrode 112 can include the gas absorbing material 122. The gas absorbing material 122 can be in the form of a powder or particulate. The lithium cell can also include a separator 122, where the gas absorbing material 122 is retained by the separator 124.

In one embodiment, a lithium cell of the present invention comprises at least two electrodes each comprising lithium titanate, e.g., $Li_4Ti_5O_{12-x}$, as described and exemplified above. The lithium cell has an electrode potential in a general condition of use that does not drop below 1.3 V, i.e., lower limit of the operating voltage range. In another embodiment, a lithium cell of the present invention comprises lithium titanate, e.g., $Li_4Ti_5O_{12-x}$ as described and exemplified above, an electrolyte 118 that decomposes at a potential vs. lithium of from 1.5 V to 3.0 V, and a surface film disposed 114 on the lithium titanate. The surface film 114 is formed as a reduction product of the electrolyte 118, an electrolyte additive, or both, as described above. The surface film 114 prevents further decomposition of the electrolyte 118 by preventing direct contact between the electrolyte 118 and the negative electrode 112. In one embodiment, the electrolyte 118 includes lithium bis(oxalate)borate (LiBOB) as an additive. It is to be appreciated that other suitable additives may also be used in addition or alternate to LiBOB, as long as the surface film 114 is formed.

The present invention also provides a lithium cell comprising at least one electrode comprising lithium titanate, e.g., $Li_4Ti_5O_{12-x}$, as described and exemplified above. In one embodiment, the lithium cell comprises at least two electrodes, each of the electrodes comprising lithium titanate, e.g., $Li_4Ti_5O_{12-x}$, as described and exemplified above. In either embodiment, the lithium cell further comprises a non-fluorinated binder, i.e., the binder does not include fluorine in its makeup. Suitable non-fluorinated binders, for purposes of the present invention include, but are not limited to, the binders as described and exemplified above that do not include fluorine, e.g., styrene-butadiene rubber (SBR). In these embodiments, the non-fluorinated binder is typically used in the electrode or electrodes, as described and exemplified above.

In certain embodiments, the electrode or electrodes comprise a first lithium titanate and a second lithium titanate different than the first lithium titanate. The first lithium titanate is of the formula: $Li_4Ti_5O_{12}$, as described above, and the second lithium titanate is that of the present invention, i.e., $Li_4Ti_5O_{12-x}$, as described and exemplified above. In certain embodiments, the second lithium titanate is disposed on at least a portion of a surface of the electrode, more preferably is disposed on a majority of the surface of the electrode, and most preferably is disposed on an entirety of the surface of the electrode. Accordingly, the second lithium titanate is typically present in the electrode in an amount greater than that of the first lithium titanate. For example in certain embodiments, the electrode includes at least 10 wt-% more of the second lithium titanate relative to the first lithium titanate, based on the weight of the first and second lithium titanate. Further, catalytic action of titanium can be reduced, and the decomposition of the binder and the electrolyte can be avoided by employing the second lithium titanate, i.e., $Li_4Ti_5O_{12-x}$, as described and exemplified above. Yet further, with charging, too large of a drop in negative electrode potential can be prevented by using the second lithium titanate in place of the first lithium titanate.

In certain embodiments, such as those described above, the non-fluorinated binder is employed because it is believed that fluorine type or fluorinated binders, i.e., binders have fluorine in their makeup, e.g., PVDF, PTFE, etc., are particularly weak against reduction. For example, there is a possibility that a fluorinated binder will decompose and generate, for example, hydrogen fluoride (HF). HF can be a highly corrosive compound, as understood in the art, and is known to be detrimental to a cell or battery when present therein. If such a gas is formed, such as with use of a fluorinated binder, expansion of the battery can be prevented by including a material that adsorbs gas that has been decomposed by lithium titanate inside the battery. Specifically, the present invention further provides a lithium cell comprising lithium titanate, e.g., $Li_4Ti_5O_{12-x}$, as described and exemplified above, and a gas absorbing material 122. Examples of suitable gas absorbing materials 122 include, for purposes of the present invention include, but are not limited to. ZnO, $NaAlO_2$, silicon, and combinations thereof. The gas absorbing material 122 can be retained by the separator 124, if employed. Typically, the lithium titanate and the gas absorbing material 122 are mixed to form the electrode(s) 112, 116. The lithium titantae and gas absorbing material 122 can be mixed in particulate or powder form. As described above, the batteries typically comprise a case, such that the gas absorbing material can also be retained by the case 111 in addition to the separator 124, if employed.

The present invention further provides a cell module (or pack) comprising a plurality of lithium cells, such as those described and exemplified above. Each of the lithium cells have a soft outer packaging and are assembled in an environment where water content in the environment is controlled. The lithium cells typically include lithium titanate, i.e., $Li_4Ti_5O_{12-x}$, as described and exemplified above. In one embodiment, the cell module comprises at least 10 lithium cells. The lithium cells are typically assembled together in a configuration, and may be arranged in various configurations relative to one another, such as those described and illustrated above. The environment is typically a dry room, in order to adequately maintain low levels of water during assembly of the cells, batteries, and/or the cell module.

The cell module generally has a seal to enclose the lithium cells, and to prevent water from entering the cell module and/or the lithium cells. Various methods may be used to form the seal. For example, welding, clamping, and/or heat-sealing may be used. Generally, a welding seal, e.g., a hermetic seal, provides the best sealing performance for the cell module. Laser welded seals may be used, for example. Heat seal methods, such as those typically used to seal soft packages of metallic laminates, can also be used as they are generally simple processes. Suitable examples of soft outer packaging, for purposes of the present invention, include, but are not limited metals laminated with plastics, typically polyolefins, e.g., polypropylene, polyethylene, etc. Suitable metals, for purposes of the present invention, are known in the art, such as aluminum. Employing various types and thicknesses of plastics can decrease the amount of metal used in the soft outer packaging, thereby reducing weight and possibly cost of the cell module. Weight concerns are particularly important for hybrid electric vehicle (HEV) applications.

In these embodiments, it is important that water does not enter or break the seal during use or operable lifetime of the cell module. Water can have various detrimental effects on the cell module, as generally understood in the art. Specifically, water can react with the electrolyte, and can generate undesirable reaction products. For example, if the electrolyte comprises a fluorinated electrolyte, e.g., $LiPF_6$, HF can be formed via reaction with water, which causes issues as described and illustrated above. The same reaction may occur if the fluorinated binder is employed. Other side reaction involving water can also occur, as understood in the art. For example, metallic lithium can deactivate with contact with water. Non-fluorinated electrolytes and binders can generally be used to alleviate these problems. Water can be controlled to be very low in the components employed to make the cells and cell module, for example, water, if present in the electrolyte, can be kept to minimums, e.g. water present in ppm amounts or less. Other components can be dried prior to assembly of the cell module. Sealing performance and strength are significant because long term reliability is particular important for HEV applications.

The following examples are intended to illustrate and not to limit the present invention.

EXAMPLES

Lithium titanate of the present invention having the formula $Li_4Ti_5O_{12-x}$ is formed according to the method of the invention as set forth above. More specifically, conventional $Li_4Ti_5O_{12}$ is first formed by forming a mixture including titanium dioxide and a lithium-based compound. The mixture is formed by introducing the titanium dioxide and the lithium-based compound into a vessel in the amounts shown in Table 1. The titanium dioxide and the lithium-based compound are mixed and milled in a ball mill for a period of about 60 minutes at least 150 rpm rotation speed using a particle size distribution measurement till particle size less than 5 μm, more preferably less than 2 μm, with unimodal distribution to ensure sufficient mixing of the titanium dioxide and the lithium-based component. The mixture is then sintered in a gaseous atmosphere, created by a gas or gas mixture with constant flow at temperatures and times as indicated in Table 1. The gas or gas mixture includes a reducing agent and an inert gas or inactive gas in the amounts indicated in Table 1. The resulting lithium titanate has the formula $Li_4Ti_5O_{12-x}$ with 0<x<0.02. Relevant properties of the lithium titanate of the present invention are also included in Table 1 below.

TABLE 1

|  | Component | Example 1 | Example 2 | Example 3 |
|---|---|---|---|---|
| Mixture | Titanium Dioxide, pbw based on total weight of mixture | 72.992 | 80.655 | 76.632 |
|  | Lithium-based Component A, pbw based on total weight of mixture | 27.008 | — | 14.178 |
|  | Lithium-based Component B, pbw based on total weight of | — | 19.345 | 9.190 |

TABLE 1-continued

| | Component | Example 1 | Example 2 | Example 3 |
|---|---|---|---|---|
| | mixture | | | |
| | Total | 100.0 | 100.0 | 100.0 |
| Gaseous Atmosphere | Reducing Agent A flow, L/(min-kg) based on total weight of mixture | 0.002 | — | — |
| | Reducing Agent B flow, L/(min-kg) based on total weight of mixture | — | 0.0025 | — |
| | Reducing Agent C flow, L/(min-kg) based on total weight of mixture | — | — | 0.05 |
| | Inert Gas A flow, L/(min-kg) based on total weight of mixture | 0.048 | 0.0225 | — |
| | Inactive Gas B flow, L/(min-kg) based on total weight of mixture | — | — | 0.095 |
| | Total | 0.05 | 0.025 | 0.1 |
| | Sintering Time, min | 120 | 100 | 180 |
| | Sintering Temperature, °C. | 850 | 900 | 800 |
| | X value in $Li_4Ti_5O_{12}$ | 0.009 ± 0.001 | 0.015 ± 0.001 | 0.005 ± 0.001 |
| | Reversible Electric Power-Generating Capacity, mA * hrs/g | 168 | 170 | 160 |
| | Crystal Structure Parameter (a), Å, at 300K | 8.36012 | 8.35978 | 8.36023 |
| | Logarithm of DC Electronic Conductivity, (S $cm^{-1}$), at 300K | −5.2 | −4.7 | −5.9 |

Lithium-based Component A is $Li_2CO_3$.

Lithium-based Component B is LiOh.

Reducing Agent A is $H_2$.

Reducing Agent B is $CH_4$ (methane).

Reducing Agent C is CO (carbon monoxide).

Inert Gas A is Argon.

Inactive Gas B is $N_2$ (nitrogen).

Comparative Example

Conventional lithium titanate having the formula $Li_4Ti_5O_{12}$ is formed in the same manner as set forth above; however the reducing agent is not present in the gaseous atmosphere. The amounts of the components used to form the conventional lithium titanate are shown below in Table 2, along with relevant properties of the conventional lithium titanate.

TABLE 2

| | Component | Comp. Example 1 | Comp. Example 2 |
|---|---|---|---|
| Mixture | Titanium Dioxide, pbw based on total weight of mixture | 72.992 | 80.655 |
| | Lithium-based Component A, pbw based on total weight of mixture | 27.008 | — |
| | Lithium-based Component B, pbw based on total weight of mixture | — | 19.345 |
| | Total | 100.0 | 100.0 |
| Gaseous Atmosphere | Inert Gas A flow, L/(min-kg) based on total weight of mixture | 0.1 | — |
| | Inactive Gas B flow, L/(min-kg) based on total weight of mixture | — | 0.2 |
| | Total | 0.1 | 0.2 |
| | Sintering Time, min | 180 | 120 |
| | Sintering Temperature, °C. | 850 | 900 |
| | X value in $Li_4Ti_5O_{12-x}$ formula | 0 ± 0.005 | 0 ± 0.0005 |
| | Reversible Electric Power-Generating Capacity, mA * hrs/g | 145 | 150 |
| | Crystal Structure Parameter (a), Å, at 300K | 8.36055 | 8.35915 |
| | Logarithm of DC Electronic Conductivity, (S $cm^{-1}$), at 300K | <−9 | ~−9 |

Results

With reference to the reversible electric power-generating capacity and the electronic conductivity of the Examples and the Comparative Example, it is apparent that the lithium titanates of the present invention exhibit higher electronic conductivity than conventional lithium titanates of the Comparative Examples, while exhibiting even higher reversible electric power-generating capacity.

Figure 6:
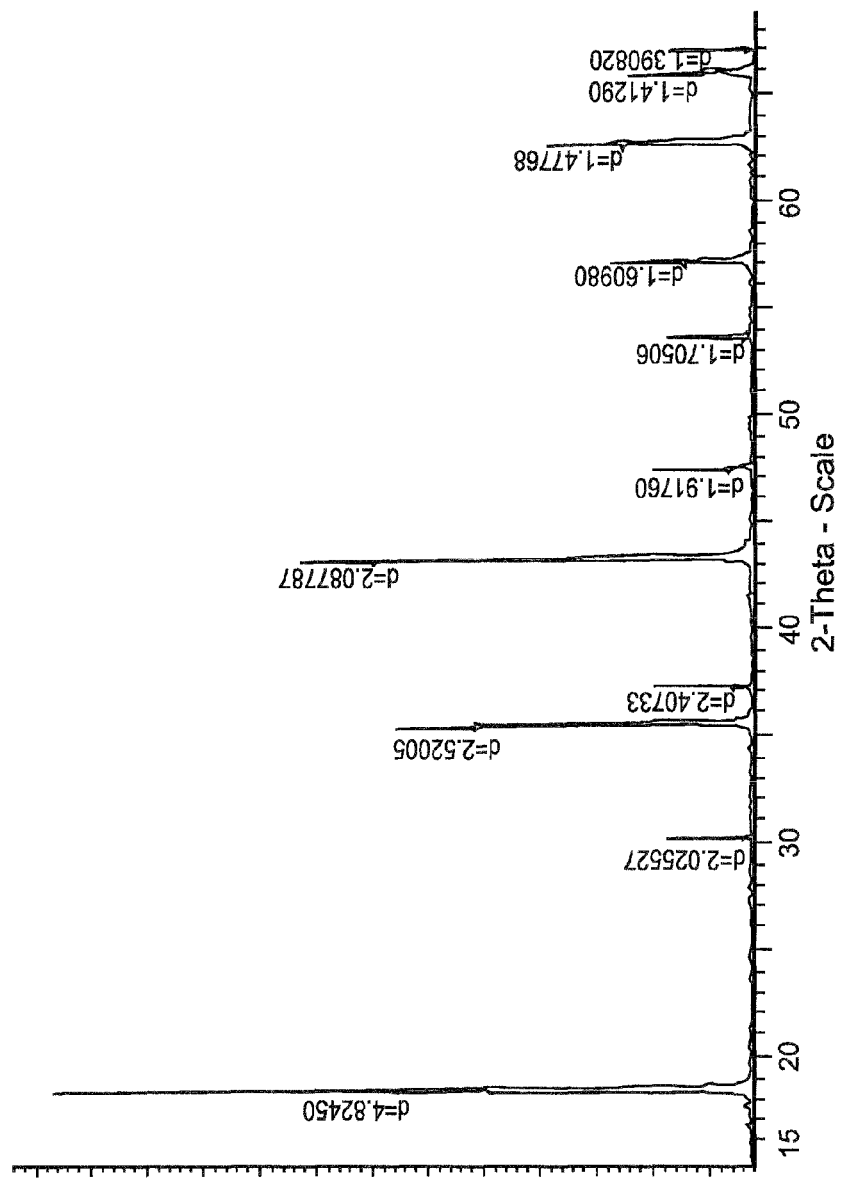
FIG. 6 is an X-ray diffraction spectra for conventional $Li_4Ti_5O_{12}$ of the prior art, synthesized according to Comp. Example 1 in Table 2.
Figure 7:
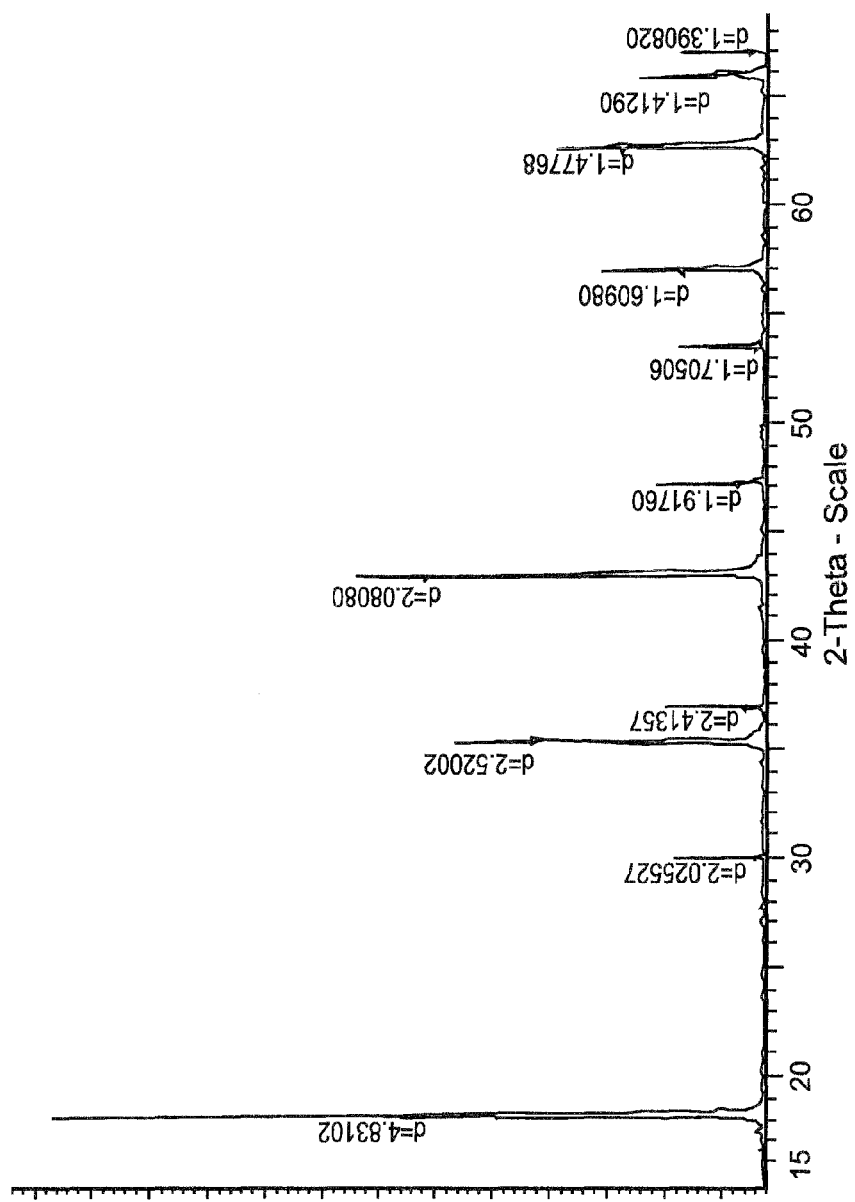
FIG. 7 is an X-ray diffraction spectra for $Li_4Ti_5O_{11.985}$ of the present invention, synthesized according to Example 2 in Table 1.

Specifically, XRD spectra are received on an x-ray diffractometer Bruker D4 on CuK$_\alpha$ radiation with Sol-X detector. All samples listed in Table 1 and 2 give well-defined spectra correspond to cubic structure (Sp. Gr. Fd-3m (227)). Small amounts of residual TiO$_2$ (0.5%) are present in most of samples. Using a full-profile analysis method. with conventional structure model (see for example, S. Scharner, W. Wepner, P. Schmid-Beurmann. Evidence of Two-Phase Formation upon Lithium insertion into the Li$_{1.33}$Ti$_{1.67}$O$_4$ Spinel, Journal of the electrochemical Society. V. 146, I. 3, pp. 857-861, 1999), parameter (a) of a cubic crystal lattice is calculated, and is shown in the Tables 1 and 2. Two typical spectra, one for Li$_4$Ti$_5$O$_{12}$ of the prior art represented by Comp. Examples 1 and 2, and one for Li$_4$Ti$_5$O$_{11.985}$ of the present invention represented by Example 2, are presented on FIGS. 6 and 7, respectively.

Figure 8:
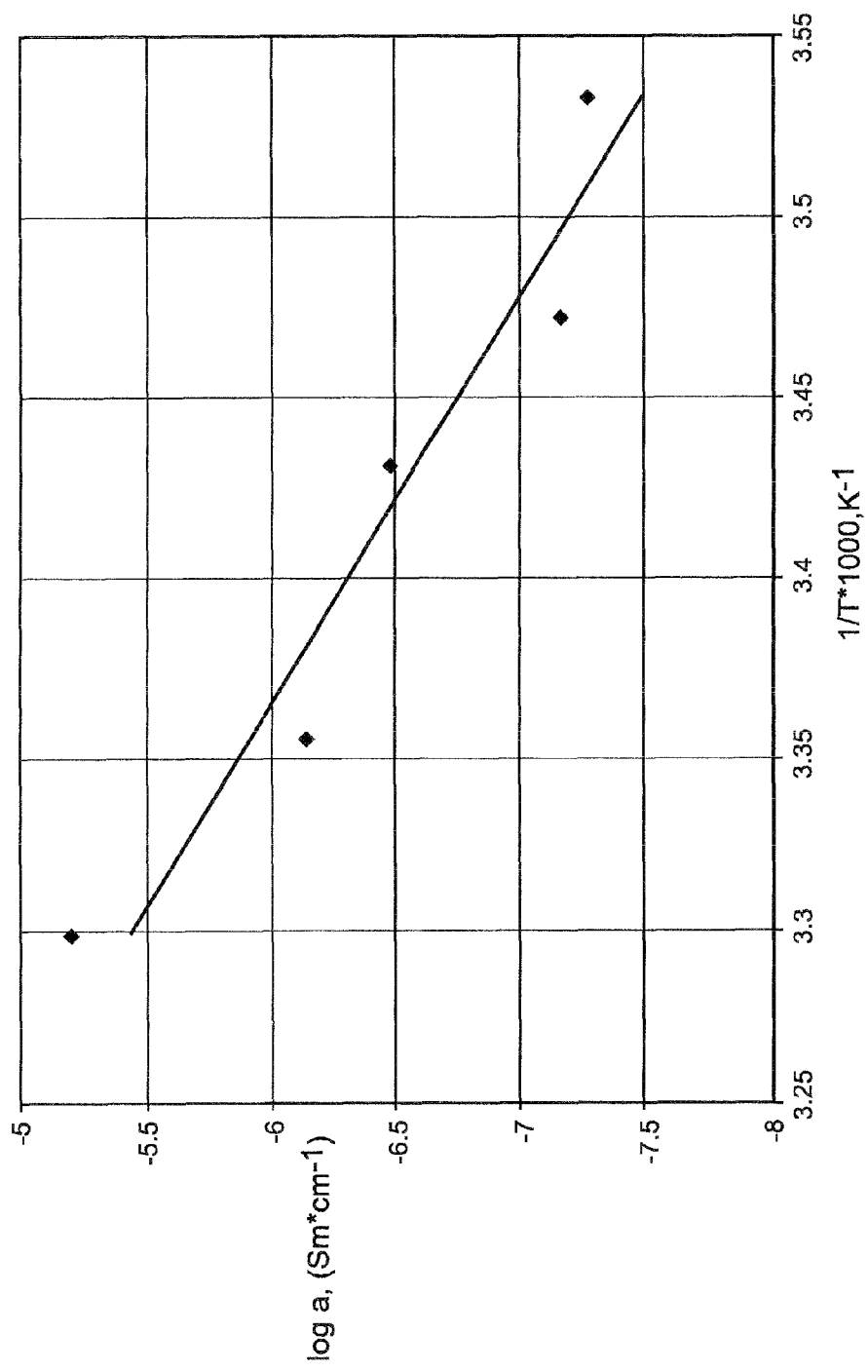
FIG. 8 is a graph showing a dependence of log ($\sigma$) vs. 1/T measured for $Li_4Ti_5O_{11.985}$ of the present invention, synthesized according to Example 2 in Table 1 and measured by the 4-probe method.

Electronic conductivity of the Examples is measured on 20 mm diameter, 2-3 mm thick pellets that have been pressed and tempered inside power samples under synthesis conditions until an equilibrium state is reached. Measurements are made by the 4-probe method on direct current, under potential of 90 volts. Attempts to receive reliable data for Li$_4$Ti$_5$O$_{12}$ samples (Table 2, Comp, Examples 1 and 2) are unsatisfactory, as the conductivity of these samples lies very close to a low limit of measurement for this method. Therefore, only order of conductivity is determinate. Results of measurements for Li$_4$Ti$_5$O$_{11.985}$, synthesized according to Example 2 in Table 1, in a narrow temperature interval of about room temperature, are shown on FIG. 8. Main sources of measurement discrepancies are the nature of compacted powder samples with significant porosity, as well as proximity to grain boundaries and contact effects.

Figure 9:
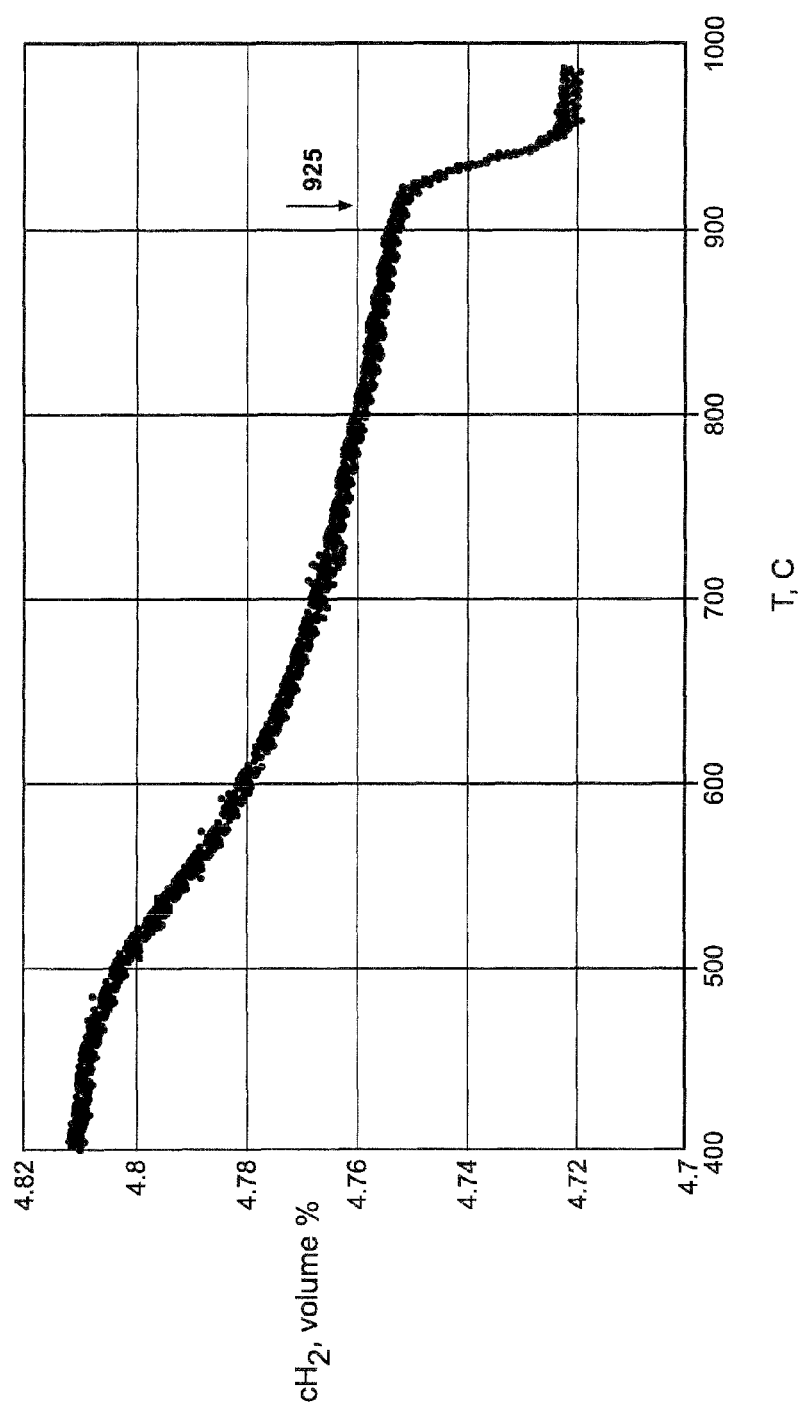
FIG. 9 is a kinetic curve of a sintering step whereby $Li_4Ti_5O_{12}$ is reduced by a $H_2$/Argon gas mixture (4.81 vol. % $H_2$), representing dependence of concentration of $H_2$ on temperature during heating with constant temperature increase of 2.5° C./min.
Figure 10:
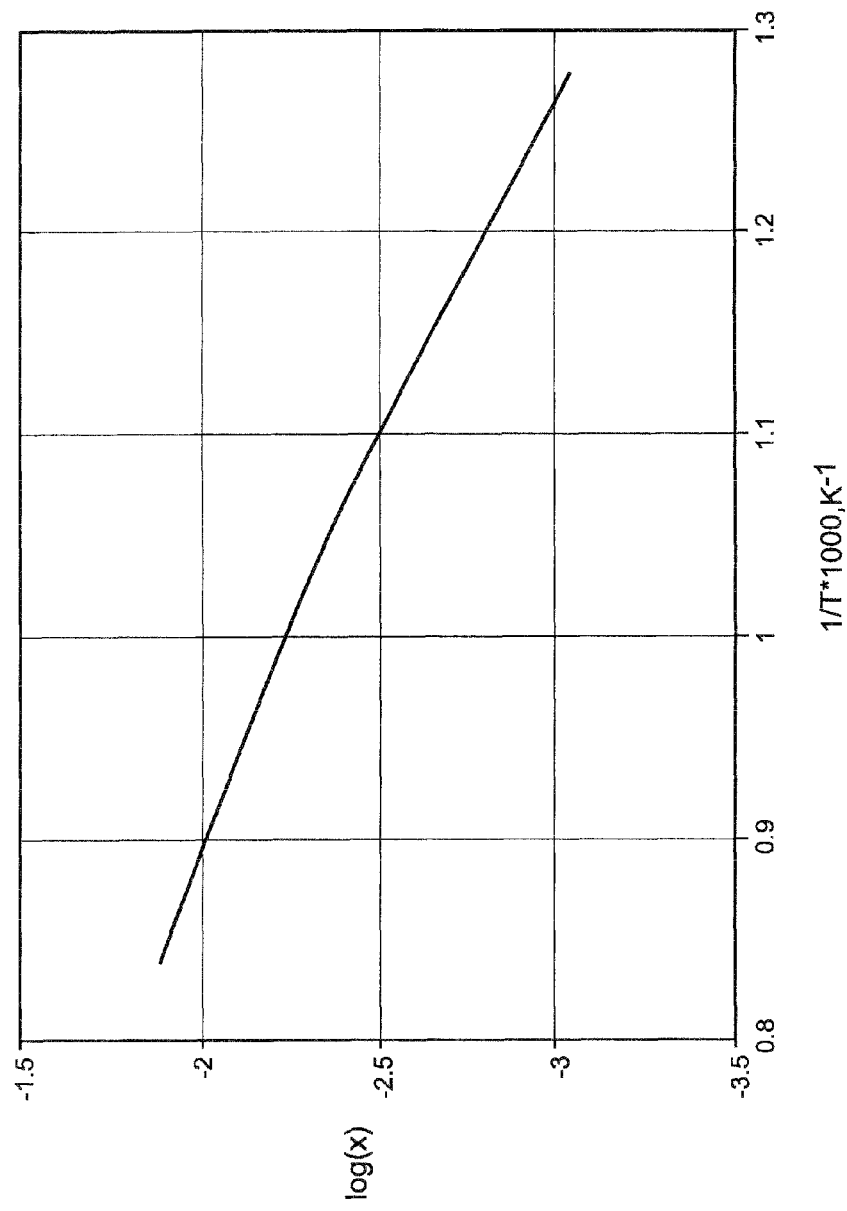
FIG. 10 is a kinetic curve of the sintering step of FIG. 7 in log (x) vs. 1/T coordinates, wherein x is x in $Li_4Ti_5O_{12-x}$.

The kinetics of the sintering step for reducing the Li$_4$Ti$_5$O$_{12}$ is tested through the Temperature Controlled Reduction method. During linear heating of samples under gaseous atmosphere including the reducing agent, gas concentration is measured after flowing past the sample. Referring to FIG. 9, dependence of concentration of hydrogen, i.e., the reducing agent, against temperature of Li$_4$Ti$_5$O$_{12}$ is shown. A difference between initial concentration of hydrogen and concentration of hydrogen after the gaseous atmosphere flows past the sample gives an amount of hydrogen used for the sintering process. By integration of this curve, using values of sample mass and gas mixture flow, it is possible to calculate the value of x in the formula Li$_4$Ti$_5$O$_{12-x}$ as a function of temperature. The reduction during the sintering step becomes appreciable after 450° C. and proceeds smoothly until 925° C. FIG. 10 shows a dependence of the logarithm of x in formula Li$_4$Ti$_5$O$_{12-x}$ against reverse absolute temperature (in Kelvin). This curve has an Arrhenius-like character and is close to linear in the temperature interval 500° C.<T<925° C.

Figure 11:
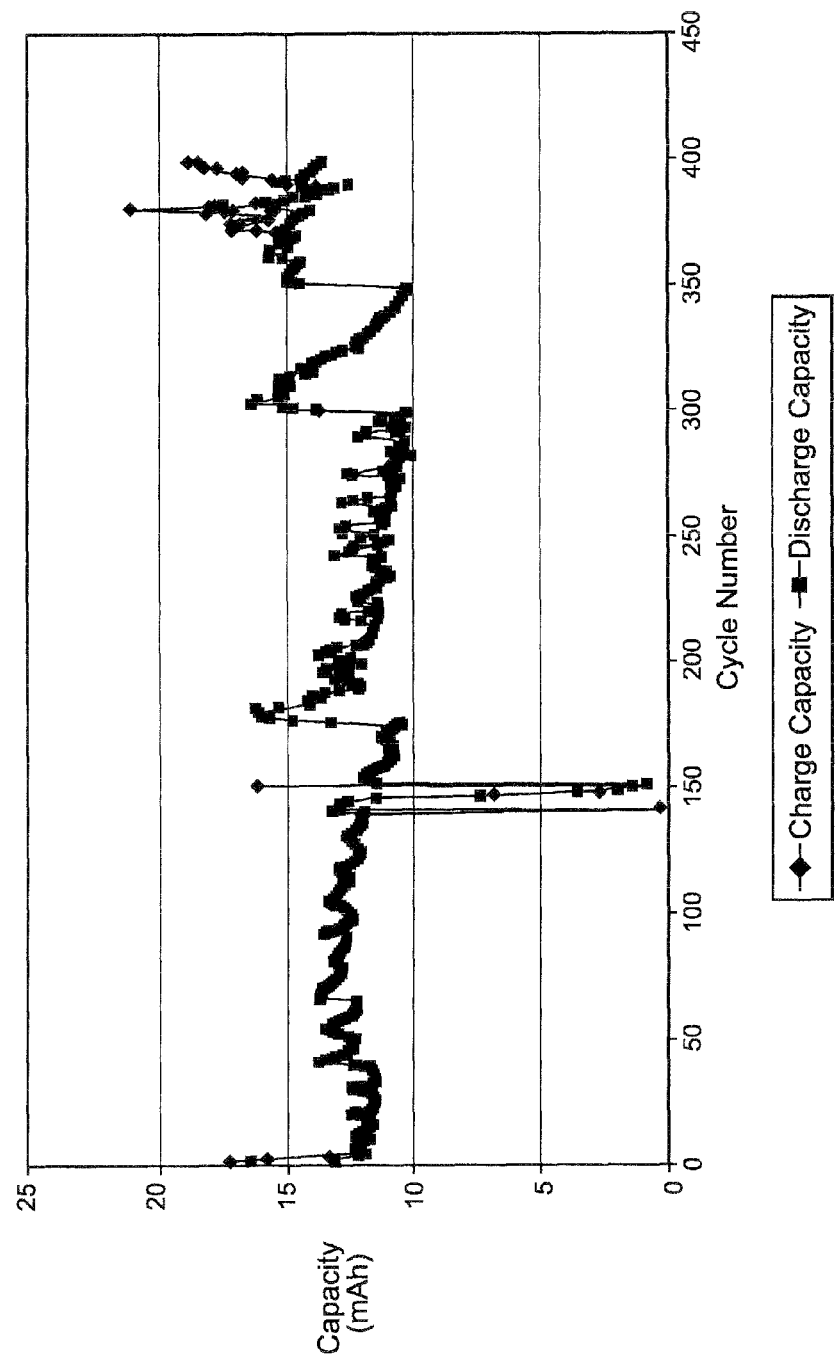
FIG. 11 is a graph showing a dependence of electric power generating capacity (mAh) vs. a number of cycles for a cell including an electrode with $Li_4Ti_5O_{12-x}$ of the present invention wherein a counter electrode is lithium metal.
Figure 12:
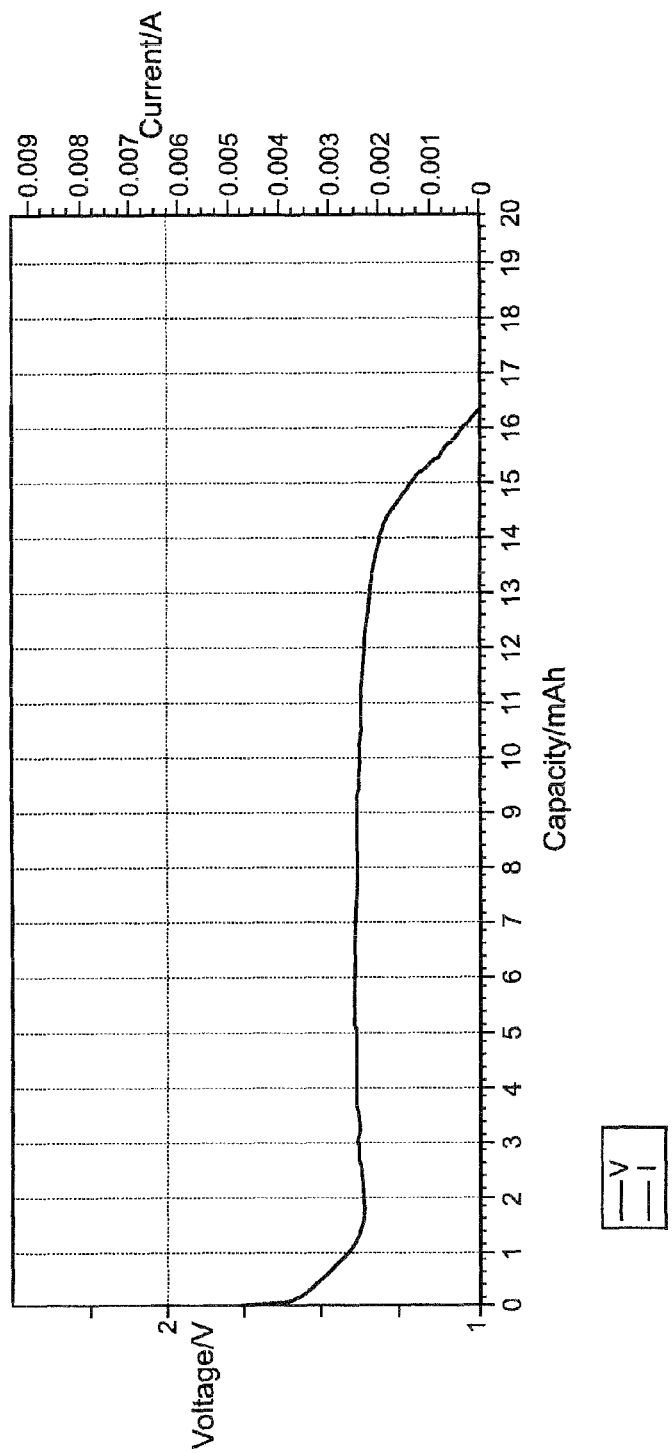
FIG. 12 is a graph showing a first discharge of a cell including an electrode with $Li_4Ti_5O_{12-x}$ of the present invention wherein a counter electrode is lithium metal.
Figure 13:
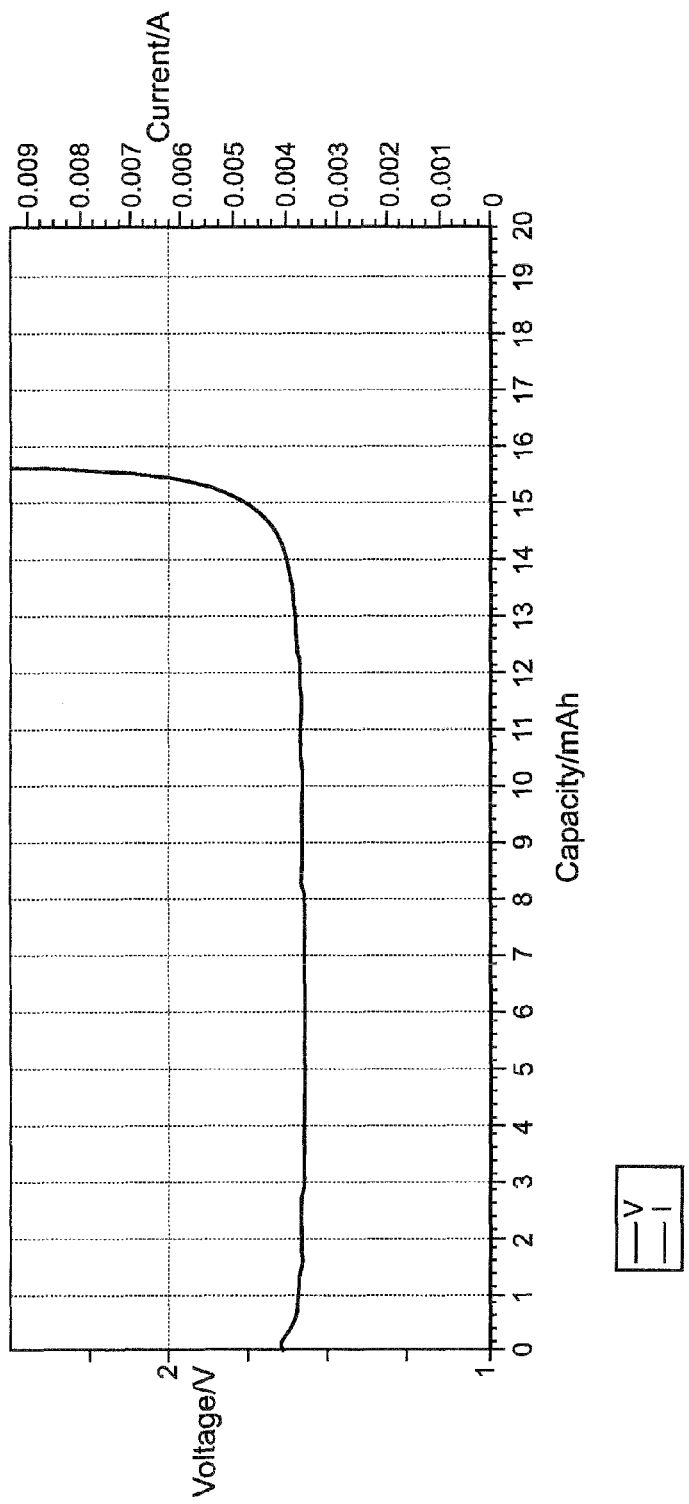
FIG. 13 is a graph showing a second charge of the cell including the electrode with $Li_4Ti_5O_{12-x}$ of the present invention wherein the counter electrode is lithium metal.
Figure 14:
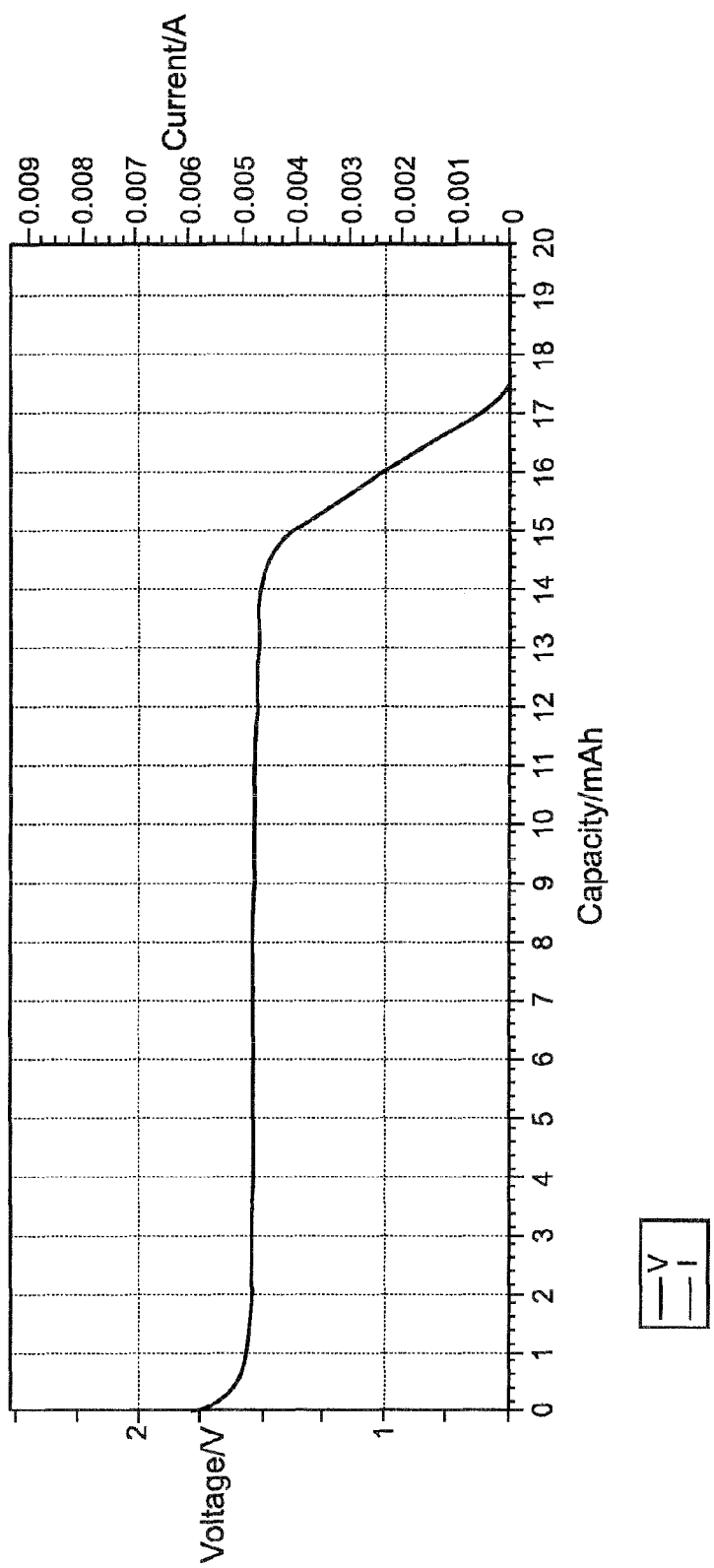
FIG. 14 is a graph showing a $382^{nd}$ discharge of the cell including the electrode with $Li_4Ti_5O_{12-x}$ of the present invention wherein the counter electrode is lithium metal.
Figure 15:
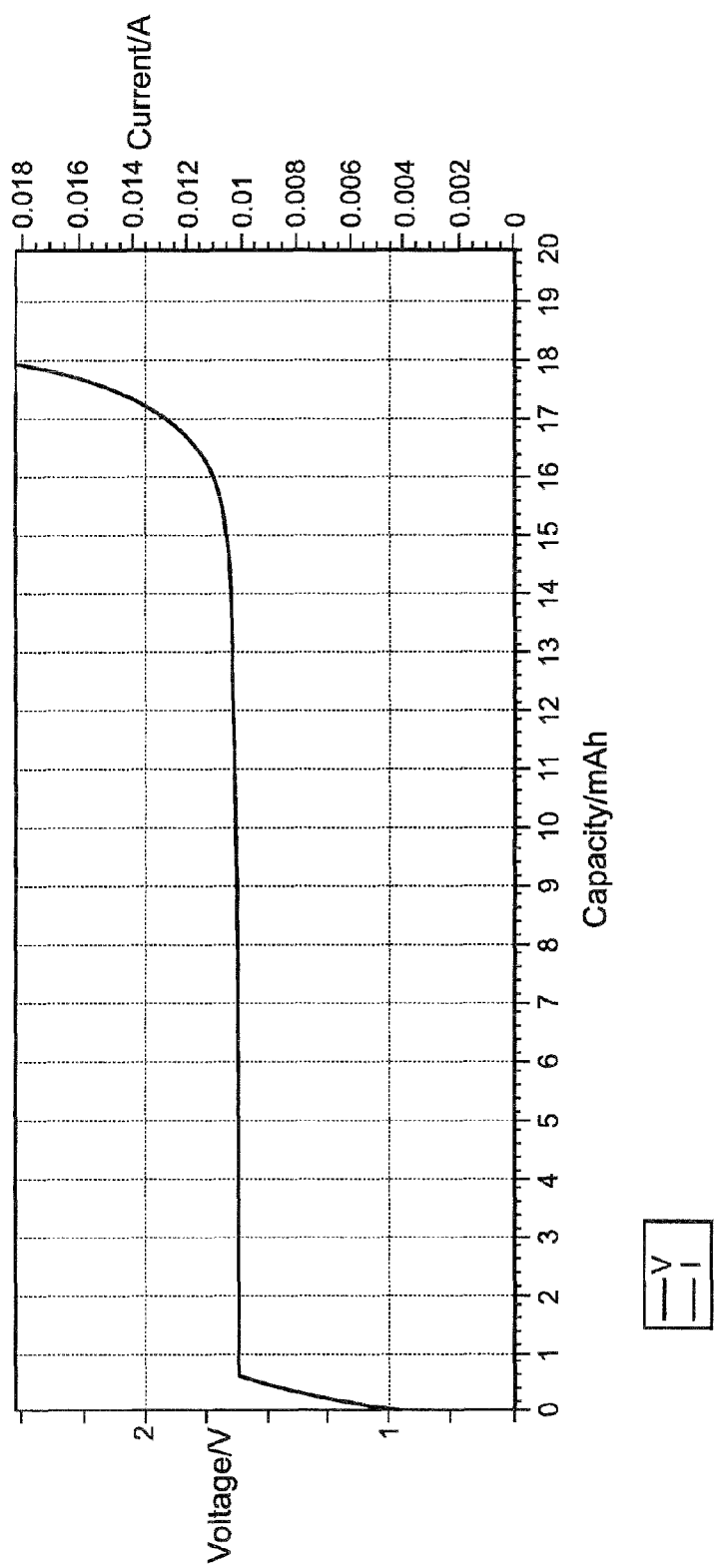
FIG. 15 is a graph showing a $382^{nd}$ charge of the cell including the electrode with $Li_4Ti_5O_{12-x}$ of the present invention wherein the counter electrode is lithium metal.

FIG. 11 shows that the lithium-based cell that includes the Li$_4$Ti$_5$O$_{12-x}$ maintains electric power generating capacity after many cycles, and FIGS. 12-15 illustrate flat charge and discharge curves of the Li$_4$Ti$_5$O$_{12-x}$ even after many cycles of charge and discharge.

Example 1

Gas Generation Comparison

This example evaluates the differences in gas generation between cells produced using conventional forming techniques and those produced using the techniques described herein. The comparative cell utilizes a standard electrolyte of composition 1.2M LiPF6 in EC/PC/EMC [25/5/70], while the inventive cell utilized a modified electrolyte of composition 1.2M LiPF6 in EC/PC/EMC [25/5/70]+0.5% LiBOB+5% Phosphazene. In addition, the comparative cell is formed using a cycling process where the cell is cycled in the normal voltage range 1.6-2.9 V. In contrast, the inventive cell is overcharged during the formation process to a state where the anode potential drops below 0.5V, thereby forming a passivation layer on the anode by reduction of the additives added to the electrolyte. The composition and formation processes of the comparative cell and the inventive cell are described in Table 3, below:

TABLE 3

| Comparative Cell | Inventive cell |
| --- | --- |
| Electrolyte: | Electrolyte: |
| 1.2M LiPF6 in EC/PC/EMC [25/5/70] | 1.2M LiPF6 in EC/PC/EMC [25/5/70] + 0.5% LiBOB + 5% Phosphazene |
| Cathode: | Cathode: |
| Mix oxide type NMC | Same as comparative cell |
| Anode: | Anode: |
| Lithium titanate LTO | Same as comparative cell |
| Separator: | Separator: |
| Polypropylene | Same as comparative cell |
| Formation process: | Formation process: |
| Charge to 2.9 V at C/20 | Charge to 3.7 V at C/20 |
| Rest 5 min | Rest 5 min |
| Discharge to 1.6 V at C/5 | Discharge to 1.6 V at C/5 |
| Rest 5 min | Rest 5 min |

Figure 16B:
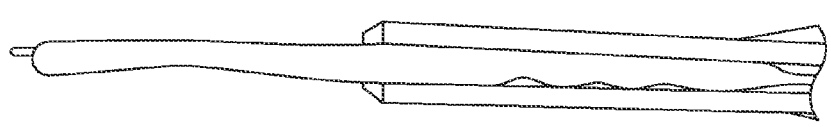
FIGS. 16A and B, show profiles of the comparative cell and the inventive cell, respectively, demonstrating that a substantial amount of gas was produced in the comparative cell, while little to no gas was generated in the inventive cell.
Figure 16A:
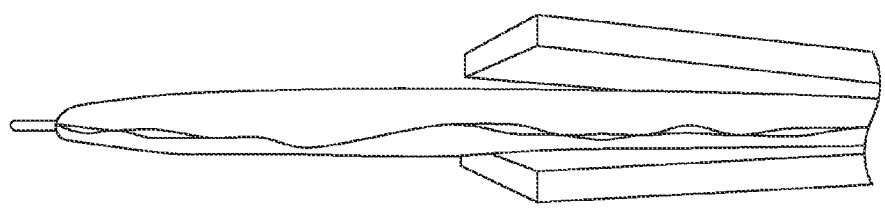

FIGS. 16A and B, show profiles of the comparative cell and the inventive cell, respectively. From the swelling in FIG. 16A, it is clear that a substantial amount of gas was produced in the comparative cell, while FIG. 16B shows that little to no gas was generated in the inventive cell.

The present invention has been described herein in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described within the scope of the appended claims.

We claim:

1. A method of manufacturing a battery, comprising:
providing a lithium cell having an operating voltage range, said lithium cell comprising:
  a negative electrode comprising at least a first lithium titanate of formula:
  Li$_4$Ti$_5$O$_{12-x}$, wherein x is greater than 0 and less than 12,
  a positive electrode, and
  an electrolyte in contact with, and between, said negative electrode and said positive electrode, wherein said electrolyte includes an additive; and
forming a coating on an interface surface of said negative electrode in contact with said electrolyte, said coating comprising reduction products of said additive, wherein said forming step comprises overcharging said lithium cell to a voltage greater than said operating voltage range and dropping a voltage of said negative electrode into a range $0 \leq V \leq 1.0$, where V is voltage.

2. The method according to claim 1, wherein a duration of said forming step is sufficient to produce a continuous coating at said interface surface.

3. The method according to claim 1, wherein said additive comprises an elemental ingredient selected from the group consisting of boron, phosphorous, sulfur, fluorine, carbon, boron, and combinations thereof.

4. The method according to claim 1, wherein said additive is an additive selected from the group consisting of lithium hexafluorophosphate ($LiPF_6$), lithium bis-oxalatoborate (LiBOB), lithium perchlorate ($LiClO_4$), lithium hexafluoroarsenate ($LiAsF_6$), lithium trifluoromethanesulfonate ($LiCF_3SO_3$), lithium trifluoromethanesulfonimide ($Li(CF_3SO_2)_2N$, lithium tetrafluoroborate ($LiBF_4$), lithium tetrachloroaluminate ($LiAlCl_4$), lithium hexafluoroantimonate ($LiSbF_6$), lithium tetrafluoro(oxalate)phosphate (LiFOP), lithium difluoro(oxalato)borate (LiFOB), phosphazenes, $CO_2$, phosphate esters, borate esters, and water.

5. The method according to claim 1, wherein said additive comprises at least one chelato borate salt.

6. The method according to claim 1, wherein said additive comprises an additive selected from the group consisting of carbonates, chloroethylene carbonate, vinylene carbonate, vinylethylenecarbonate, sulfites, ethylene sulfite, propane sulfone, propylene sulfite, butyrolactones, phenylethylene carbonate, phenylvinylene carbonate, catechol carbonate, vinyl acetate, vinylethylene carbonate, dimethyl sulfite, fluoroethylene carbonate, trifluoropropylene carbonate, bromo gamma-butyrolactone, fluoro gamma-butyrolactone, and combinations thereof.

7. The method according to claim 1, wherein said additive comprises lithium bis-oxalatoborate (LiBOB), phosphazene, or a mixture of both.

8. The method according to claim 1, wherein x is less than 0.02.

9. The method according to claim 1, wherein an average valence of titanium in said first lithium titanate is less than 4.

10. The method according to claim 1, wherein said positive electrode comprises lithium titanate.

11. The method according to claim 1, wherein a lower limit of said operating voltage range is 1.3 V or greater.

12. The method according to claim 1, wherein said electrolyte decomposes at a potential vs. lithium of from 1.5 V to 3.0 V; and
said coating prevents decomposition of said electrolyte at voltages ranging from 0 to 4V.

13. The method according to claim 1, wherein, in addition to said first lithium titanate, said negative electrode further comprises:
a second lithium titanate different from said first lithium titanate, said second lithium titanate having the following formula: $Li_4Ti_5O_{12}$;
wherein said first lithium titanate is present in said negative electrode in an amount greater than that of said second lithium titanate.

14. The method according to claim 13, wherein said negative electrode includes at least 10 wt-% more of said first lithium titanate than said second lithium titanate, based on the total weight of the first and second lithium titanate.

15. The method according to claim 1, wherein said lithium cell further comprises a gas absorbing material.

16. The method according to claim 15, wherein said gas absorbing material is selected from the group consisting of ZnO, $NaAlO_2$, silicon, and combinations thereof.

17. The method according to claim 15, wherein said negative electrode comprises said gas absorbing material.

18. The method according to claim 15, wherein said lithium cell further comprises a separator and said gas absorbing material is retained by said separator.

19. A method of manufacturing a battery, comprising:
providing an electrolyte with an additive; and
manufacturing a lithium cell comprising:
a negative electrode in contact with said electrolyte, said negative electrode comprising a lithium titanate of formula: $Li_4Ti_5O_{12-x}$, wherein x is greater than 0 and less than 12, said negative electrode having a surface coating comprising reduction products of said additive; and
a positive electrode in contact with said electrolyte, said positive electrode comprising a mix oxide type NMC.

20. The method according to claim 19, wherein said surface coating is formed on said negative electrode by overcharging said lithium cell and dropping a voltage of said negative electrode into a range $0 \leq V \leq 1.0$, where V is voltage.

21. A method of manufacturing a battery, comprising:
providing an electrolyte with an additive comprising lithium bis-oxalatoborate (LiBOB) and phosphazene, wherein said electrolyte includes 0.5% bis-oxalatoborate (LiBOB) and 5% phosphazene; and
manufacturing a lithium cell comprising:
a negative electrode in contact with said electrolyte, said negative electrode comprising lithium titanate, said negative electrode having a surface coating comprising reduction products of said additive; and
a positive electrode in contact with said electrolyte.

* * * * *